(12) United States Patent
Halper et al.

(10) Patent No.: US 10,398,974 B2
(45) Date of Patent: Sep. 3, 2019

(54) SYSTEMS AND METHODS FOR INTERACTIVE ELECTRONIC GAMES HAVING SCRIPTED COMPONENTS

(71) Applicant: Kuma LLC, New York, NY (US)

(72) Inventors: Keith Halper, Summit, NJ (US); Michael Thompson, North Brunswick, NJ (US); Hu Jin, Fresh Meadows, NY (US); Christopher Ian Backlund, Seattle, WA (US); Paul Blieka, Troy, NY (US)

(73) Assignee: Kuma LLC, New York, NY (US)

( * ) Notice: Subject to any disclaimer, the term of this patent is extended or adjusted under 35 U.S.C. 154(b) by 0 days.

(21) Appl. No.: 16/163,002

(22) Filed: Oct. 17, 2018

(65) Prior Publication Data

US 2019/0046879 A1  Feb. 14, 2019

Related U.S. Application Data

(60) Provisional application No. 62/573,512, filed on Oct. 17, 2017.

(51) Int. Cl.
*A63F 13/35* (2014.01)
*A63F 13/47* (2014.01)
(Continued)

(52) U.S. Cl.
CPC .............. *A63F 13/47* (2014.09); *A63F 13/35* (2014.09); *A63F 13/86* (2014.09); *G06Q 30/0241* (2013.01)

(58) Field of Classification Search
None
See application file for complete search history.

(56) References Cited

U.S. PATENT DOCUMENTS 8,423,892 B1 *  4/2013  Marsland ................ H04L 67/38
                                                    446/175
9,218,468 B1 * 12/2015  Rappaport ............... H04L 51/32
(Continued)

OTHER PUBLICATIONS

"Narrative and Choice: An Examination of the Telltale Formula," 2016, https://younerded.com/2015/12/09/narrative-and-choice-an-examination-of-the-telltale-formula/.
(Continued)

*Primary Examiner* — Ronald Laneau
(74) *Attorney, Agent, or Firm* — DLA Piper LLP (US)

(57) ABSTRACT

Systems and methods for providing an interactive gaming experience. The system is configured to generate a virtual game space accessible by at least two player devices, provide access of the virtual game space to the at least two player devices, receive one or more commands for controlling objects in the virtual game space from among the at least two player devices, aggregate actions taken by the objects in the virtual game space responsive to the received one or more commands, determine that the aggregate of the actions corresponds to a trigger event, identify that the trigger event corresponds to progression to a next phase of the multiplayer game, update the virtual game space to include one or more sets of game attributes corresponding to the next phase, generate an updated game display, and transmit the updated game display to the at least two player devices.

30 Claims, 13 Drawing Sheets

(51) Int. Cl.
*G06Q 30/02* (2012.01)
*A63F 13/86* (2014.01)

(56) References Cited

U.S. PATENT DOCUMENTS

2009/0265639 A1* 10/2009 Shuster .................. G06Q 30/02
 715/747
2012/0264511 A1* 10/2012 Marsland ................ H04L 67/38
 463/31

OTHER PUBLICATIONS

"Google's Game-Streaming Plan Answers None of Our Questions," Oct. 1, 2018, Fast Company, https://amp.fastcomnany.com/90244740/googles-game-streaming-plan-answers-none-of-our-questions.
"What Does Split-Screen Co-Op Mean for Call of Duty: Black Ops 3 Blackout?," Oct. 11, 2018, https://www.vgr.com/what-does-split-screen-co-op-mean-for-call-of-duty-black-ops-4-blackout/.

* cited by examiner

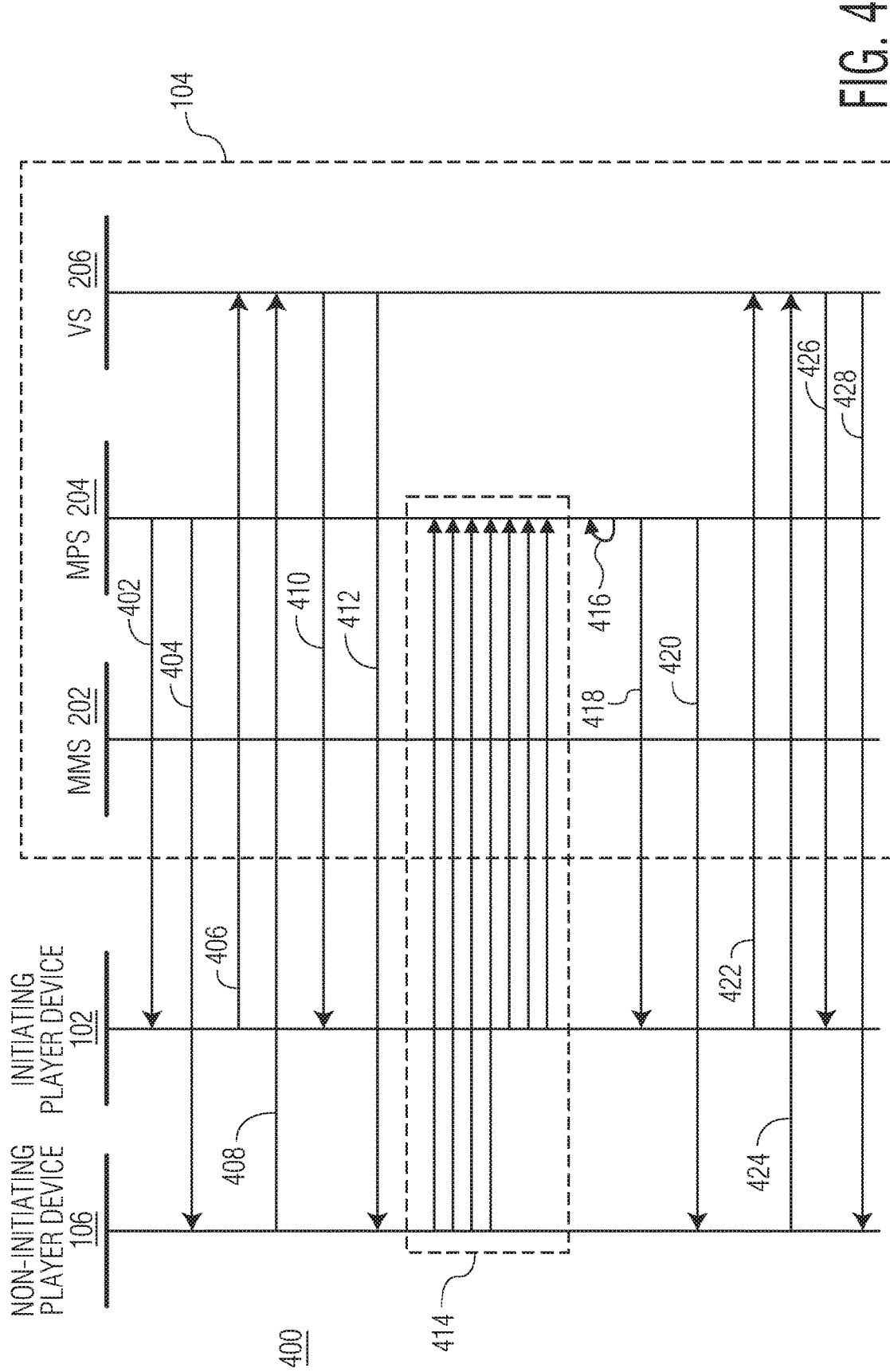

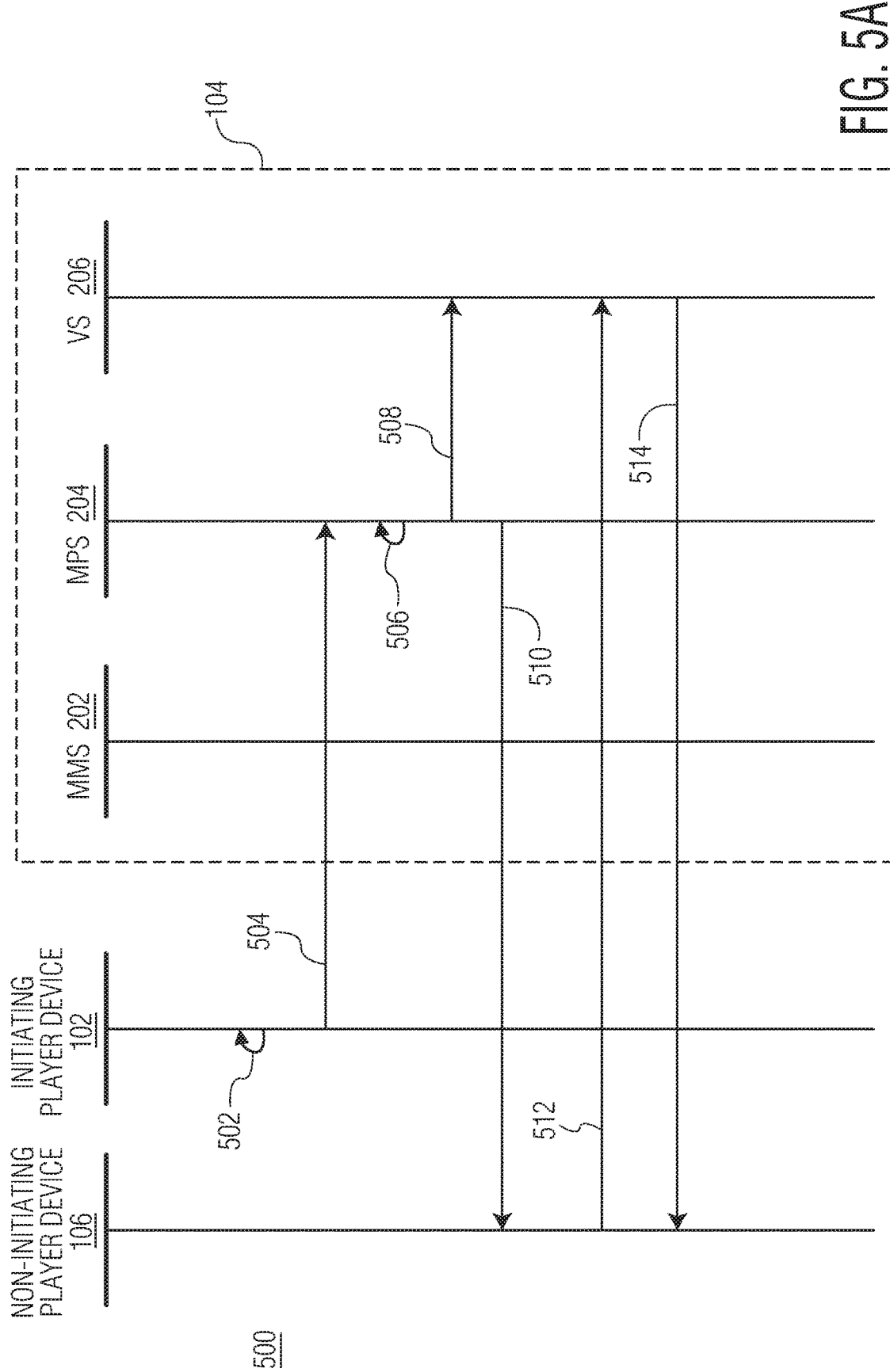

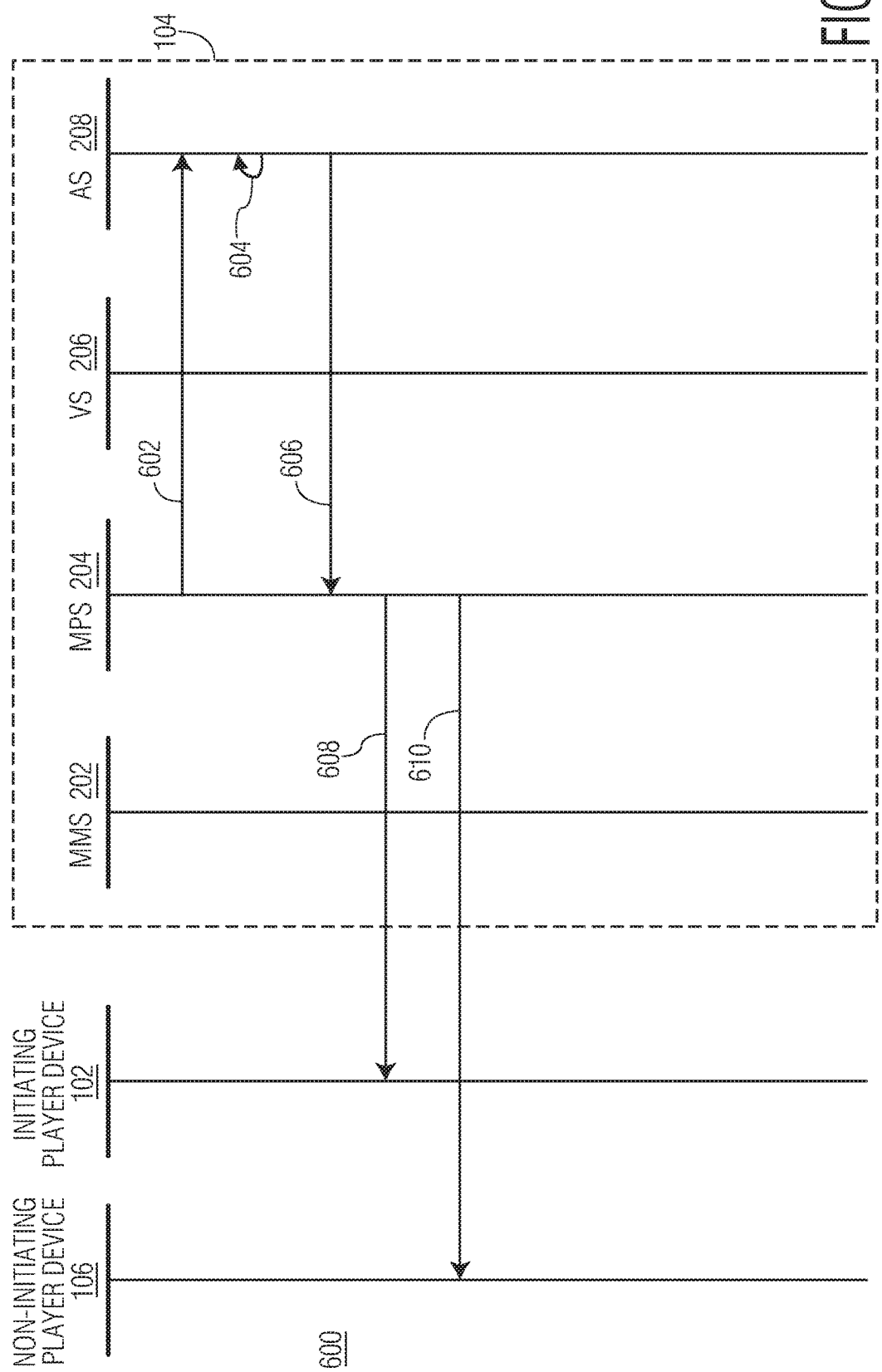

SYSTEMS AND METHODS FOR INTERACTIVE ELECTRONIC GAMES HAVING SCRIPTED COMPONENTS

TECHNICAL FIELD

The present disclosure is directed towards systems and methods for providing an interactive and social gaming experience in connection with scripted programs (e.g., broadcast programming).

BACKGROUND

Electronic games or video games are interactive experiences for players but are often unsocial, as the players are immersed in an imagined world without regard to the people or objects that surround them in the real world. For this reason, electronic games often provide a solitary experience. By contrast, conventional television is known to be both a social and non-interactive experience. For example, television is social in that viewers often view television as a group, and discuss the content of what they view in various forums ranging from online discussion boards to cafeterias. At the same time television is non-interactive, in that viewers are unable to interact with the content that they are viewing.

Accordingly, there is a need for technologies that integrate the social aspects of television with the interactivity of video games.

SUMMARY

Embodiments disclosed herein generally related to a system and method for providing an interactive and social gaming experience. In some embodiments, a system is disclosed herein. The system includes at least two player devices and an interactive gaming platform. The interactive gaming platform comprises a processor and a memory. The interactive gaming platform is communicatively coupled to the at least two player devices via at least one network. The interactive gaming platform is configured to generate a virtual game space accessible by the at least two player devices. The virtual game space represents a multiplayer game that includes one or more phases. Each phase includes one or more trigger events. The interactive gaming platform is configured to provide access of the virtual game space to the at least two player devices. The interactive gaming platform is further configured to receive one or more commands for controlling objects in the virtual game space from among the at least two player devices. The interactive gaming platform is further configured to aggregate actions taken by the objects in the virtual game space responsive to the received one or more commands. The interactive gaming platform is further configured to determine that the aggregate of the actions taken by the objects in the game instance corresponds to a trigger event. The interactive gaming platform is further configured to identify that the trigger event corresponds to progression to a next phase of the multiplayer game. The interactive gaming platform is further configured to update the virtual game space to include an updated game display depicting the next phase of the multiplayer game. The interactive gaming platform is further configured to transmit the updated game display to the at least two player devices.

In some embodiments, a method of managing a virtual game space is disclosed herein. An interactive gaming platform provides access to a virtual game space to at least two player devices. The virtual game space represents a multiplayer game that includes one or more phases. Each phase includes one or more trigger events. The interactive gaming platform receives one or more commands for controlling objects in the virtual game space from among the at least two player devices. The interactive gaming platform aggregates actions taken by the objects in the game instance responsive to the received one or more commands. The interactive gaming platform determines that the aggregate of the actions taken by the objects in the game instance corresponds to a trigger event. The interactive gaming platform identifies that the trigger event corresponds to progression to a next phase of the multiplayer game. The interactive gaming platform updates the virtual game space to include an updated game display depicting the next phase of the multiplayer game The interactive gaming platform transmits the updated game display to the at least one player device.

In some embodiments, a non-transitory computer readable medium is disclosed herein. The non-transitory computer readable medium includes one or more sequences of instructions, which, when executed by one or more processors, cause the one or more processors to perform operations. The operations include providing access to a virtual game space to at least two player devices. The virtual game space represents a multiplayer game that includes one or more phases. Each phase includes one or more trigger events. The operations include receiving one or more commands for controlling objects in the virtual game space from among the at least two player devices. The operations include aggregating actions taken by the objects in the game instance responsive to the received one or more commands. The operations include determining that the aggregate of the actions taken by the objects in the virtual game space corresponds to a trigger event. The operations include identifying that the trigger event corresponds to progression to a next phase of the multiplayer game. The operations include updating the virtual game space to include an updated game display depicting the next phase of the multiplayer game. The operations include transmitting the updated game display to the at least two player devices.

BRIEF DESCRIPTION OF THE DRAWINGS

FIG. 4 is a signal flow diagram illustrating example communication among one or more components of the computing environment of FIG. 1, according to example embodiments.

FIG. 5A is a signal flow diagram illustrating example communication among one or more components of the computing environment of FIG. 1, according to example embodiments.

FIG. 6 is a signal flow diagram illustrating example communication among one or more components of the computing environment of FIG. 1, according to example embodiments.

DETAILED DESCRIPTION

Figure 1:
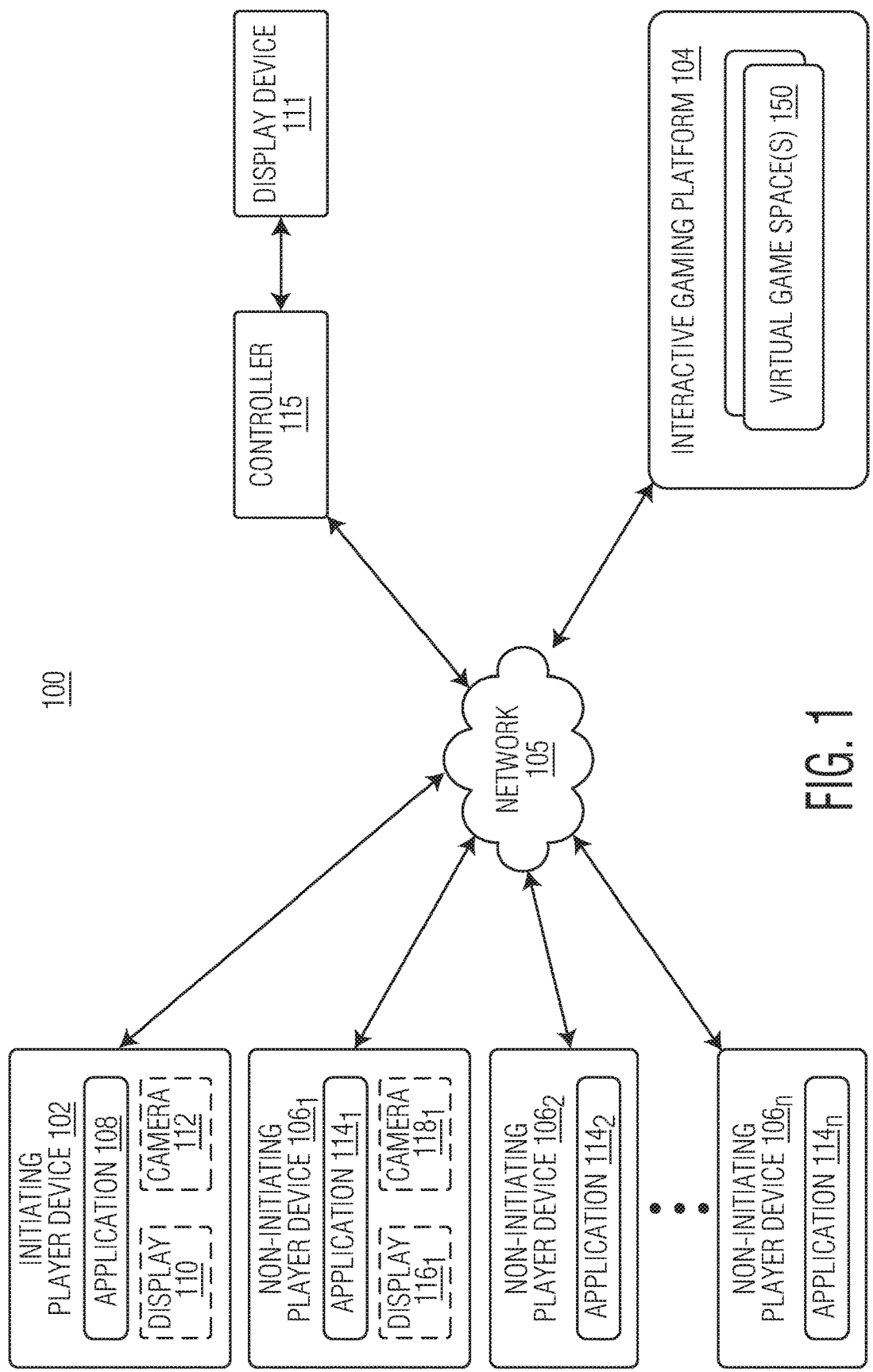
FIG. 1 is a functional block diagram illustrating an example computing environment for interactive multiplayer virtual gaming, according to example embodiments.

The present disclosure is directed towards systems and methods for providing an interactive and social gaming experience in connection with scripted programs (e.g., broadcast programming). For example, the present disclosure provides an interactive gaming platform that is configured to host one or more virtual game spaces, with each virtual game space representing a virtual environment in which the play of a game takes place.

An interactive gaming platform of the present disclosure may be configured to provide an interactive environment that creates a more natural story experience. Conventional multiplayer gaming environments suffer from one or more limitations. For example, in conventional systems, the more decisions the players get to make, the more varied the required responses from characters in the story are, resulting in a greater amount of programming and media required for each interaction. Decision trees that provide the backbone for storytelling in conventional systems tend to grow exponentially. As a result, it is increasingly difficult for conventional multiplayer systems to support a more natural story experience, as adding interactive characters only increases the story tree, which becomes near-impossible to manage.

The one or more techniques and systems described herein provide an improved interactive gaming platform that addresses the limitations of conventional multiplayer systems. In particular, the interactive gaming platform of the present disclosure includes intelligent character systems that implement a node-based story map. Characters in the game can respond to user actions and video/audio input, while using the current state of the game, prior player actions, character "goals" to select a response to player input. Characters may be designed to act like characters in a story. Specifically, the interactive gaming platform may include a set of rules for each individual character that the individual character obeys in responding to player behavior and dialogue. By implementing a node-based story map, the interactive gaming platform may create complex and flexible stories that conventional systems are unable to produce.

Further, through use of an artificial intelligence server, characters in the game may change over time, by having a different rule sets for each character for different parts of the story. For example, a character may be unhelpful and gruff in speech at the beginning of a game session and then, after surviving many adventures with the player and exchanging dialog, the character might risk their "life" to save the player in some peril, reflecting their now closer relationship to the player. In another example, a character may be reluctant to join the player in attacking aliens at the beginning of a game session and then, after seeing their beloved moon destroyed, may demonstrate through dialogue choices, reckless spaceship piloting and other behaviors that reflect a change in their behavior from one of caution to a desire for revenge. In both examples, the character has changed as a result of things that have happened to him or her. Accordingly, at every point in the story (i.e., storypoint node), each character may have a specific rule set. As such, when the character progresses from a first storypoint node to a second storypoint node, the character's rule sets, dialogue, and/or goals may change. In other words, with the interactive gaming platform of the present disclosure, a string of "triggers" may occur in shared gameplay that may trigger a character change. Because the trigger(s) may result from one or more events, the interactive gaming platform may control character settings/behavior to make it appear as if the experience of the event(s) may affect the character, similar to how events may affect a person in the real world.

In some embodiments, the one or more techniques and systems described herein may allow players to customize the gaming experiences. For example, each virtual game space may include one or more elements that are "made" by viewers and incorporated into the overall story of the game. It is envisioned that this may allow for increased viewer ownership of the game as well as increased loyalty, retention and revenue.

Further, the present disclosure describes systems and methods where multiple players in the same physical space (e.g., a living room) may access and play a game in the same virtual game space. As will be discussed further, players may command objects in the virtual game space to perform tasks cooperatively within the virtual game space. Aggregation of player actions may move the storyline of the virtual game forward by, for example, satisfying one or more triggering events that progress the game from a first phase of the story to a second phase. In this manner, the gaming experiences provided by the systems and methods described herein are both interactive and social.

In some embodiments, the systems and methods described herein may be applied to situational comedies (sitcoms), procedurals, epic series, mini-series, and the like. In one embodiment, the interactive and social TV programming provided by the systems and methods described herein may be referred to as a TV Gameisode. Accordingly, one or more embodiments disclosed herein enable players to participate in TV shows (for instance), much as they might a video game—that is in first-person, affecting outcomes, in conjunction with other players both in their living room and around the world—both socially and interactively. TV Gameisodes may include elements that are scripted (like TV shows) as well as elements that are related to 2D or 3D gaming.

FIG. 1 is a functional block diagram illustrating a computing system 100, according to example embodiments. Computing system 100 may be used for interactive and social gaming experiences. As illustrated, computing system 100 may include at least an initiating player device 102, one or more non-initiating player devices 106$_1$, 106$_2$, and 106$_n$ (generally "non-initiating player device 106"), and interactive gaming platform 104 communicating over network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Initiating player device 102 may be operated by a user (or customer). Initiating player device 102 may be a mobile device, a tablet, a desktop computer, or any computing system having the capabilities described herein. For example, initiating player device 102 may be representative of a mobile device such as tablet computers (e.g., Apple iPad, Samsung Galaxy Tab, etc.), a smart phone (e.g., Apple iPhone, Blackberry Phone, Android Phone, etc.), a gaming device (e.g., Playstation, Xbox), a smart watch (e.g., Apple Watch, etc.), a Personal Digital Assistant (PDA), a Personal Computer device (PCs; through a web browser and installable software) and other similar devices. Initiating player device 102 may belong to or be provided to a user (or customer) or may be borrowed, rented, or shared. Customers may include individuals such as, for example, subscribers, clients, prospective clients, or customers of an entity associated with interactive gaming platform 104, such as individuals who have obtained will obtain, or may obtain a product, service, or consultation from an entity associated with interactive gaming platform 104.

Initiating player device 102 may include at least application 108. Application 108 may be representative of a web browser that allows access to a website or a stand-alone application. Initiating player device 102 may access application 108 to access one or more functionalities of interactive gaming platform 104. Initiating player device 102 may communicate over network 105 to request, for example, a web page from interactive gaming platform 104. For example, initiating player device 102 may be configured to execute application 108 to access content managed by interactive gaming platform 104. The content that is displayed to initiating player device 102 may be transmitted from interactive gaming platform 104 to initiating player device 102, and subsequently processed by application 108 for display.

In some embodiments, initiating player device 102 may be associated with one or more audio/visual input/output devices. For example, initiating player device 102 may be associated with display 110 and, in some examples, camera 112. Although not shown, initiating player device 102 may also include at least one microphone for capturing audio and/or at least loudspeaker for outputting audio Display 110 may be any suitable display, such as, but not limited to a touchscreen of a personal computing device, a monitor associated with a computing device, a television, and the like. Display 110 may be configured, for example, to display one or more graphical user interfaces (GUIs) transmitted to initiating player device 102 from interactive gaming platform 104. Camera 112 (in some examples, in conjunction with at least one microphone) may be configured to capture one or more streams of audio (e.g., via at least one microphone) and/or visual frames of information and transmit the one or more streams of audio and/or visual frames to interactive gaming platform 104 for processing.

Non-initiating player device 106 may be operated by a user (or customer). For example, non-initiating player device 106 may be a mobile device, a tablet, a desktop computer, or any computing system having the capabilities described herein. Non-initiating player device 106 may belong to or be provided to a customer or may be borrowed, rented, or shared. Customers may include individuals, such as, for example, subscribers, clients, prospective clients, or customers of an entity associated with interactive gaming platform 104, such as individuals who have obtained, will obtain, or may obtain a product, service, or consultation from an entity associated with interactive gaming platform 104.

Non-initiating player device 106 may include at least application 114. Application 114 may be representative of a web browser that allows access to a website or a stand-alone application. Non-initiating player device 106 may access application 114 to access one or more functionalities of interactive gaming platform 104. Non-initiating player device 106 may communicate over network 105 to request a webpage, for example, from interactive gaming platform 104. For example, non-initiating player device 106 may be configured to execute application 114 to access content managed by interactive gaming platform 104. The content that is provided to non-initiating player device 106 may be transmitted from interactive gaming platform 104 to non-initiating player device 106, and subsequently processed by application 114 for display.

In some embodiments, non-initiating player device 106, similar to initiating player device 104, may be associated with one or more audio/visual input/output devices. For example, initiating player device 106 may be associated with display 116 and, in some examples, camera 118. Although not shown, initiating player device 102 may also include at least one microphone for capturing audio and/or at least loudspeaker for outputting audio. Display 116 may be any suitable display, such as, but not limited to a touchscreen of a personal computing device, a monitor associated with a computing device, a television, and the like. Display 116 may be configured, for example, to display one or more graphical user interfaces (GUIs) transmitted to non-initiating player device 106 from interactive gaming platform 104. Camera 118 (in some examples, in conjunction with at least one microphone) may be configured to capture one or more streams of audio (e.g., via at least one microphone) and/or visual frames of information and transmit the one or more streams of audio and/or visual frames to interactive gaming platform 104 for processing.

In some embodiments, computing system 100 may further include a separate display device 111. Display device 111 may be referred to herein as a shared screen. Display device 111 may be associated with a controller 115. In some embodiments, controller 115 may be integrated with display device 111 (e.g., smart TV). In some embodiments, controller 115 may be associated with display device 111. For example, controller 115 may be representative of a digital media device coupled with controller 115 either wirelessly or wired. Exemplary digital media devices may include, but are not limited to, AppleTV, FireTV, Android TV, Google Chromecast, Roku, and the like. Generally, controller 115 may be configured to request and/or receive one or more webpages from interactive gaming platform 104 for rendering and display.

In some embodiments, initiating player device 102 and one or more non-initiating player devices 106 (and in some cases, display device 111) may be physically present in the same location and intend to play the same game. In some embodiments, initiating player device 102 and at least one non-initiating player device 106 may be physically separated in two different locations, while still playing the same game.

Interactive gaming platform 104 may be configured to generate and manage an interactive and social gaming experience for end users. Interactive gaming platform 104 may be representative of one or more computing devices. For example, interactive gaming platform 104 may be representative of a distributed computing system, wherein each device of the distributed computing system may act as a host for one or more virtualization elements (e.g., operating system (OS)-level virtualization elements, hardware-level virtualization elements) that include one or more modules or engines for facilitating and managing the interactive social gaming experience for end users.

Interactive gaming platform 104 may host one or more virtual game spaces 150. Each game space 150 may represent a virtual environment in which the play of a game takes place. In some embodiments, each game space 150 may host one or more of a two-dimensional game, a three-dimensional game, a video-based game, etc. Each game space 150 may include one or more rules or parameters associated therewith. For example, each games pace 150 may include one or more metrics or rules associated with how users (e.g., initiating player device 102, non-initiating player device 106) may interact with avatars or characters in a gaming world.

In operation, initiating player device 102 may register and/or login with interactive gaming platform 104 to gain access to a virtual game space 150. Upon registering and/or logging in, initiating player device 102 may be matched to particular virtual game space 150 in interactive platform 104. Interactive platform 104 may further transmit an identification code that corresponds to the particular virtual game space 150 to initiating player device 102. The identification code may be used by one or more non-initiating player devices 106 to join initiating player device 102 in the virtual game space. For example, initiating player device 102 may provide one or more non-initiating player devices 106 with the identification code such that the one or more non-initiating player devices 106 may join the game space.

To join initiating player device 102 in the particular virtual game space 150, non-initiating player device 106 may register and/or log into interactive gaming platform 104, by transmitting the identification code to interactive gaming platform 104. For example, non-initiating player device 106 may download and/or execute application 114 to transmit the identification code to interactive gaming platform 104. After non-initiating player device 106 provides the identification code to interactive gaming platform 104, interactive gaming platform 104 may provide non-initiating player device 106 with access to the particular virtual game space 150, where all the players present in the virtual game space 150 are participants in the same game.

In some embodiments, interactive gaming platform 104 may prompt non-initiating player device 106 to select a role to play within the virtual game space 150. For example, in a combat focused game, interactive gaming platform 104 may prompt non-initiating player device to select a role, such as, but not limited to, a pilot, bombardier, navigator, and the like. The players may then collaborate together to complete the game. The term "couch coop" or "couch cooperative" may refer to the manner in which players (e.g., initiating player device 102 and non-initiating player device 106) may collaborate in the virtual game space while at the same time being located in a common physical space in real-life.

Gameplay in each virtual game space 150 may be driven, for example, by both direct and indirect control. In direct control, a player (e.g., initiating player device 102, non-initiating player device 106) may directly control an object or character. For example, the player may fly a ship, drop a bomb, or swing a sword. By contrast, in indirect control, a player may issue commands to an onscreen character in order to control an object or character. For example, a player may communicate with a fire-team leader and instruct the fire-team leader to enter a building. In an additional example, a player may instruct the engine room to make the ship advance at flank speed.

In some embodiments, the indirectly controlled objects and characters within virtual game space 150 may have independent agency. For example, the indirectly controlled objects and characters may reject the commands issued by the player and/or talk back to the player. When an object or character talks back to a player, the object or character may play a pre-recorded video. The use of indirect control may mitigate the delays associated with network communication between initiating player device 102, non-initiating player device 106, and interactive gaming platform 104.

In some embodiments, gameplay in virtual game space 150 may be driven by direct control when the game is played by a single player on an initiating player device 102. A game driven by direct control may be configured for fast responses to player activity and fast-action gameplay such as first-person shooter games, flying games, real-time sports and the like.

In some embodiments, gameplay in a virtual game space 150 may be driven by indirect control when the game is played by multiple players, with one or more players operating an initiating player device 102 and the remainder of the players operating non-initiating player devices 106. Initiating player device 102 may be configured to communicate with the interactive gaming platform 104 via a local area network using wireless or hardwired connections to the Internet. By contrast, non-initiating player devices 106 may be configured to communicate with the interactive game platform 104 via wireless communication protocols (e.g., Wi-Fi™, long-term evolution (LTE), 3G, and other cellular data networks). Accordingly, the connection speed and communication between the non-initiating player devices 106 and the interactive gaming platform 104 may be slower than that between the initiating player device 102 and interactive gaming platform 104. As such, indirect control of objects within the game may be preferred, such that the latency between indirect control and direct control (on the order of about 50-300 milliseconds) does not impact the perceived smoothness of the game, allowing all players to control objects within the game on an equal timescale.

Interactive gaming platform 104 may further be configured with two separate video capabilities. In a first capability, interactive gaming platform 104 may facilitate video chat among participants to a virtual game space 150. In such embodiments, interactive gaming platform 104 may serve as a mediator between all users in a particular virtual game space 150 (i.e., all players communicatively coupled to the multiplayer server 204). For example, during gameplay, players may record videos of themselves using their respective user devices (i.e., non-initiating player device 106 and/or initiating player device 102). The recorded videos may be processed on the user device and then transmitted to the interactive gaming platform 104 for transmittal to the intended recipients' user device(s). In some embodiments, interactive gaming platform 104 may transmit the video to controller 115.

In a second capability, interactive gaming platform 104 may facilitate character videos configured for inclusion into a game's storyline. Character videos may be uploaded by players and/or fans to interactive gaming platform 104. When users are playing, the videos may be called by the game upon game events and streamed onto a display associated with initiating player device 102 or non-initiating player device 106, or on display device 111. Accordingly, interactive gaming platform 104 may enable players to generate and upload character videos after the game is created. This may result in stories and/or characters that are different than those envisioned when the game is first developed.

Generally, displaying the game on one or more of player devices 102, 106 and/or display device 115 may include a depiction of the state of the game, including, but not limited to, audio and/or text descriptions of the game.

Figure 2:
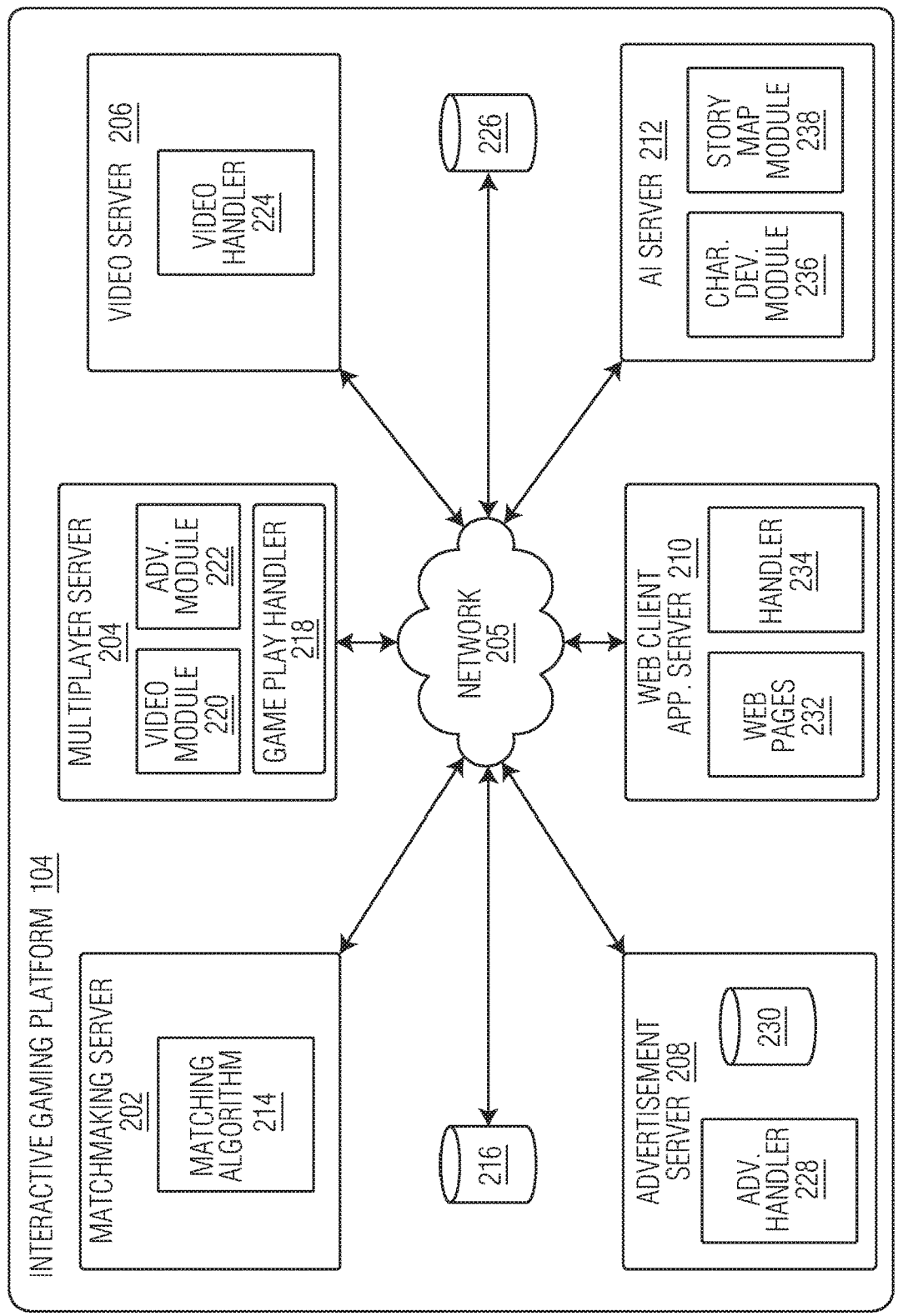
FIG. 2 is a functional block diagram illustrating an example interactive gaming platform which may be part of the computing environment of FIG. 1, according to example embodiments.

FIG. 2 is a functional block diagram illustrating one or more components of interactive gaming platform 104 in more detail, according to example embodiments. Gaming platform 104 may include at least one matchmaking server (MMS) 202, at least one multiplayer server (MPS) 204, video server (VS) 206, and web client application server 210. In some embodiments, interactive gaming platform 104 may further include advertisement server 208 and artificial intelligence (AI) server 210.

As shown, matchmaking server 202, multiplayer server 204, video server 206, advertisement server 208, web client application server 210, and AI server 212 may communicate via network 205 (which may be configured similarly to network 105). In some embodiments, one or more of matchmaking server 202, multiplayer server 204, video server 206, advertisement server 208, web client application server 210, and AI server 212 may be representative of one or more physical computing devices. In some embodiments, one or more of matchmaking server 202, multiplayer server 204, video server 206, advertisement server 208, web client application server 210, and AI server 212 may be virtual servers embodied across one or more virtualization elements executing on one or more physical computing devices.

Matchmaking server 202 may be configured to manage one or more connections among initiating player device 102, non-initiating player device 106, and one or more servers of multiplayer server 204. Matchmaking server 202 may include at least matching algorithm 214. Matchmaking server 202 may be associated with database 216. Generally, for each game instance managed by interactive gaming platform 104, there may be a corresponding matchmaking server 202. Matchmaking server 202 may be configured to receive an initiation request from one or more player devices (e.g., initiating player device 102, non-initiating player device 106), and match each player device (102, 106) to particular virtual game space 150. Matchmaking server 202 may be configured to maintain a list of servers, locations, vacancies, and the like on database 216 in order to match an initiating player or a non-initiating player to virtual game space 150. For example, matchmaking server 202 may maintain a list of servers (instances of multiplayer server 204), their corresponding game spaces (including number of players, player information, and the like), the episodes running in the game space, and other factors such as ping and network location. The data maintained by matchmaking server 202 may be used to match a player to the most desirable virtual game space 150 or a server instance of multiplayer server 204. In some examples, a 'most desirable virtual space' may refer to the instance of multiplayer server 204 that most closely is represented by the application specific data set provided by the server and the application specific player request. For example, an instance that is desirable may have a rank of 1 and an instance that is undesirable may have a rank of 0. When all instances of multiplayer server 204 are ranked, the first instance with the highest rank may be chosen as the most desirable virtual space.

In some embodiments, matchmaking server 202 may leverage matching algorithm 214 to match an initiating player device 102 to a particular instance of multiplayer server 204 and assign initiating player device 102 to a particular game space. Matching algorithm 214 may include a series of cascading checks for one or more matching features. Matching features may include items such as clan affiliation, rankings, equipment, and the like. In some embodiments, variables for matching features may be added at any time during the game. In some embodiments, matchmaking server 202 may allow for game specific code modules to be added, that may allow game specific logic to be used to filter what matches players are assigned.

Matching algorithm 214 may include a series of tests that may be completed to match a player device 102, 106 to a particular instance of multiplayer server 204. Matching algorithm 214 may leverage, for example, two sets of data to rank the priority of one or more instances of multiplayer server 204. The first set of data may be provided by a player device 102, 106, and may be directed to what a player would like in a server; the second set of data may be provided by each instance of multiplayer server 204 to identify a current state of each instance. The custom data field is where each instance may store its application specific data set (e.g., number of players in a game).

When a player device (e.g., 102 and/or 106) attempts to find a matching server instance of multiplayer server 204, the player device may send custom data in its request. The data that may be provided in the request may be dependent on application specific logic. For example, player device 102 and/or 106 may want to join a server instance that has no other players, or a server instance that is almost full of players. The request may be used to pass a custom JSON file with the player's desired joining selection.

Matchmaking server 202 may also be extensible with a set of custom filters that are used in ranking each server. The filters take in the JSON provided by the player, and compare it with each server registered in database 216.

The filter may be in the form 'float filterResult(string serverJSON,float currentRank)'. In this way, interactive gaming platform 104 may chain together basic filters to form more elaborate pipelines of logic.

As one example, assume there is an instance of multiplayer server 204 that takes two custom parameters: currentPlayers and maximumPlayers. These values may represent the number of players in the server instance, and the number of players allowed in a server instance.

A player device (102, 106) may send a request for a server instance, with custom data fields named desiredOccupancy. This field may represent the normalized target 'fullness' of a server, described as currentPlayers/maximumPlayers.

When matchmaking server 202 receives the player request, matchmaking server 202 may generate a filter named rankByFullness which tests the normalized values against each other (desiredOccupancy against currentPlayers/maximumPlayers). Matchmaking server 202 may generate values between 0 and 1 with how close the desiredOccupancy and currentPlayers/maximumPlayers values are. If the value is very close, the returned value may be 1. If the value is too low, the returned value may be 0 (with a gradient of values between).

The returned value may represent the rank of server, with 1 being desirable and 0 being undesirable. When chained together, multiple filters can achieve advanced ranking combinations.

In the case in which a player device (102, 106) seeks a near full server, matchmaking server 202 may take in the JSON from the instance of multiplayer server 204, and read (e.g., compare) the number of players that exist against the maximum number of players allowed.

Each instance of multiplayer server 204 may register with matchmaking server 202 by passing an initial set of data. Each instance of multiplayer server 204 may continually update this data with a heartbeat of synchronizations. The set of data may include, but is not limited to, a unique identifier, an internet protocol (IP) address, a port, custom data field, and the like.

Matchmaking server 202 may further assign each non-initiating player device 106 to a particular sever instance of multiplayer server 204. For example, matchmaking server 202 may receive from non-initiating player device 106 a unique identification code. Based on the unique identification code, matchmaking server 202 may transmit to the non-initiating player device 106 an internet protocol (IP) address for the particular server of multiplayer server 204 associated with the particular game space corresponding to the unique identification code.

Multiplayer server 204 may be configured to control and/or manage one or more multiplayer game spaces. For example, multiplayer server 204 may be configured to track player actions (e.g., of initiating player device 102, of non-initiating player device 106) throughout the game, and update the game accordingly. Multiplayer server 204 may include game play handler 218, video module 220, and advertisement (Adv.) module 222.

Game play handler 218 may be configured to monitor user activity during game play. In some embodiments, the multiplayer server 204 may execute custom scripts that run in the background of each virtual game space 150 to track user activity during game play. For example, game play handler 218 may execute a third party daemon program (e.g., FireDaemon) to ensure that the custom scripts and game instances continue to execute. Using a specific example, should the game in virtual game space 150 crash, the third party daemon program may identify the crash and restart the game. Game play handler 218 may further manage character actions, as well as the location, velocity, and character damage of each character in the game space. Game play handler 218 may be configured to hold a definitive version of the game state, and the games running on the initiating player device 102 and/or non-initiating player device 106 may update to match the game state on multiplayer server 204.

Game play handler 218 may be configured to identify one or more key moments (or events) during game play. For example, at key moments of the game, game play handler 218 may instruct non-initiating player devices 106 and initiating player devices 102 to request one or more videos from video server 206 and/or advertisements from advertisement server 208. The requested videos and/or advertisements may be streamed and replayed on a display screen associated with initiating player device 102 and/or a display screen associated with non-initiating player device 106. In some embodiments, game play handler 218 may instruct non-initiating player device(s) 106 and/or initiating player device 102 to request a specific video from video server 206. In other words, game play handler 218 may instruct initiating player device 102 and/or non-initiating player devices 106 to contact video server 206 to request a video with specific features, such as, for example, a particular episode, phase, role, and/or action.

Video module 220 may be configured to manage one or more videos uploaded to interactive gaming platform 104 from initiating player device 102 and non-initiating player devices 106. For example, initiating player device 102 and/or non-initiating player device 106 may capture one or more streams of audio and/or visual data, process the audio and/or visual data on the respective device (e.g., converted from a video to compressed GIF's streamed audio and visual data, etc.) and then transmit the video(s) to interactive gaming platform 104 for display. Video recording module 220 may store the received video in database 226 managed by video server 206.

Upon receiving a video from a player device non-initiating player device 106, initiating player device 102), multiplayer server 204 may transmit the video to one or more players within the same multi-player game space 150. In some embodiments, as default, multiplayer server 204 may always transmit the video to initiating player device 102 and/or one or more non-initiating player devices 106 that is communicatively coupled to display device 111.

In some embodiments, multiplayer server 204 may make received videos available to third party administrators prior to transmitting the video to one or more player devices 102, 106 or shared screen 111. For example, multiplayer server 204 may provide the received recorded videos to an administrator device (not shown) such that the recorded videos may be screened (by either human or by algorithm) for objectionable content.

Multiplayer server 204 may further facilitate character videos configured for inclusion into a game's storyline. For example, video module 220 may be configured to include character videos that are uploaded by players and/or fans into the game's storyline. When users are playing, the uploaded character videos may be called by video module 220 in response to one or more game events and transmitted to at least one of the player devices 102, 106 and/or on display device 111. In this way, character videos that are generated and uploaded by players after the game is created and initiated may communicate stories and character roles that differ from stories and character roles envisioned when the game was first developed. By allowing users to alter both the storyline and character roles, interactive gaming platform 104 may allow users to continue to play within the same virtual game space 150, while simultaneously ensuring that users may not be tied to the same storyline.

Advertisement module 222 may be configured to manage one or more advertisements for inclusion in virtual game space 150. For example, advertisement module 222 may work in conjunction with advertisement server 208 to display one or more advertisements to one or more players in virtual game space 150 (e.g., via player device 102, player device(s) 106 and/or display device 111). In some embodiments, the displayed advertisements may prompt players to click on information, advertisements, and/or a purchasing process for the items displayed.

In some embodiments, database 216 may further maintain information related to instances of multiplayer server 204 that have registered with matchmaking server 202. Database 216 may be an open source, in-memory data structure store such as Redis®. Database 216 may also include a customized application that allows for flexible data management. Database 216 may include a back-end system that is built on a hypertext preprocessor (PHP) configured to sort through incoming traffic, and interface with database 216 to update database 216 with live information corresponding to multiplayer server 204. Furthermore, the customized application and back-end system may be configured such that all instances of multiplayer server 204 may easily communicate with matchmaking server 101.

In some embodiments, a player device (102, 106) may leave virtual game space 150 or stop participating by unregistering from multiplayer server 204. The onscreen character corresponding to the leaving player device (102, 106) may disappear from all other player devices (102, 106), and/or display device 111. In some embodiments, a player who respawns (i.e., a player corresponding to a character that has been killed in the video game appears again in the game after some time) may not be unregistered from multiplayer server 204. Instead, the player's game state may be changed, and the game may be configured to have a time-delay, where the player is unable to move the game's storyline forward. Players may be treated differently based on the game. For example, if multiple players form a single character (i.e., a spaceship) or many characters (i.e., a team of firefighters). In space based video game, a space ship that is destroyed may be placed in a holding area such as a launch tube until the time-delay is passed. In a military based video game, where a player corresponds to a single character of a larger team, the character may disappear due to a critical injury and reappear once the time-delay is passed, while the remaining characters of the team may continue gameplay.

Video server 206 may be configured to manage one or more videos for inclusion in one or more virtual game spaces 150. In some examples, video server 206 may be a Wowza streaming server or a Content Delivery Network (CDN) server made available to users of each virtual game space 150. Video server 206 may include video handler 224. Video server 206 may be associated with database 226. Video handler 224 may be configured to work in conjunction with video module 220 of multiplayer server 204. For example, upon game play handler 218 identifying one or more triggering actions during game play in virtual game space 150, game play handler 218 may instruct video handler 224 to retrieve one or more videos from database 226.

In some embodiments, video files may be temporarily stored in a storage location until the videos are approved by an administrator. For example, an administrator may process videos for quality, size, audio, and blank space, transcript, and add user reputation and identify information and add video filters. After approval by an administrator, the video files may be stored in database 226. Videos stored in the database 226 may include video information such as Phase, Role (i.e., which roles should see it), Trigger event (i.e., what causes the video to play), Creator (i.e., who created the video), and the like. Videos stored in the database 226 may be edited, replaced, updated, and deleted.

Database 226 may further include one or more key-value pairs. A key-value pair may associate a video with a particular phase of the game, as determined by the game time or key events. In some embodiments, a particular game may have a fixed number of key-values, and as a new video is uploaded they may be associated with one of the fixed number of key-values. For example, there may be five key-values associated with a first phase of a game. If a player, fan, or administrator attempts to upload a sixth video, one of the existing videos may be replaced with the sixth video. In some embodiments, a game may be updated by providing one or more videos having existing key-values. The key-value pairs may be maintained in database 226 and downloaded from video server 206 to each player device 102, 106 and/or controller 115 associated with display device 111 before each game session.

In operation, during key moments of gameplay, multiplayer server 204 may instruct player devices 102, 106 and/or controller 115 to call one or more videos from video server 206. Game play handler 218 may choose the video based on, for example, a phase, role, trigger event, and creator. For example, the key moments of gameplay may indicate a particular trigger event that corresponds to one or more videos stored in database 226. Game play handler 218 may identify a video that meets the trigger event requirement. In some embodiments, game play handler 218 may further limit its search to videos created by a player to the virtual game space 150. Accordingly, game play handler 218 may interface with video module 220, such that video module 220 can instruct one or more player devices 102, 106 and/or controller 115 to request the identified video from video server 206.

In some embodiments, the trigger event may be the result of a player's action during gameplay. In some embodiments, one or more videos corresponding to one or more trigger events may be pre-loaded on player devices 102, 106 and/or display device 111. Accordingly, when game play handler 218 identifies the corresponding trigger event, video module 220 may instruct player devices 102, 106 and/or display device 111 to retrieve the corresponding video from local storage. In some embodiments, trigger events may include one or more end trigger events. Each end trigger event may be a specific kind of trigger that ends one phase of the game (or story in the game) and moves to a new phase. Generally, at each phase of the game are one or more potential next phases. The specific next phase that is trigger may depend on the aggregate activity of all player devices 102, 106 in the game.

In some embodiments, the videos stored in database 226 may include videos generated by interactive gaming platform 104 and one or more videos injected into one or more game spaces 150 by players to each respective games space 150. Accordingly, videos that may be provided to the players may vary after the game is published. For example, videos containing new characters and stories may be added to a particular game space 150 by including such new characters and stores in one or more videos stored in database 226. Such functionality may occur after game space 150 is initiated.

Advertisement server 208 may be configured to manage one or more advertisements for inclusion in virtual game space 150. Advertisement server 208 may include advertisement (Adv.) handler 228 and advertisement database 230. Advertisement module 222 of multiplayer server 204 may interface with advertisement server 208 to provide one or more advertisements to one or more of player devices 102, 106 and/or controller 115 for display. Upon game play handler 218 identifying one or more triggering actions during game play in virtual game space 150, for example, advertisement module 222 may instruct advertisement handler 228 to retrieve one or more videos from advertisement database 230.

In some embodiments, advertisement server 208 may be provided by a third party network (e.g., AdMob, UnityAds) separate from interactive gaming platform 104. In some embodiments, advertisement server 208 may be integrated with interactive gaming platform 104. In some examples, advertisement handler 228 may receive and/or retrieve one or more advertisements from advertisement database 230 on a third party network. Advertisement database 230 may include advertisements from multiple advertisers.

In some embodiments, advertisement module 222 may choose an advertisement based on a weighting of advertisers stored in a file related to interactive gaming platform 104. In some embodiments, the weighting may be stored on advertisement server 208 in extensible markup language (XML) format.

In operation, advertisement module 222 may instruct one or more player devices 102, 106 and/or controller 115 to request one or more advertisements from advertisement handler 228, such that the one or more advertisements may be integrated into the particular game space 150. In some embodiments, advertisement module 222 may instruct one or more player devices 102, 106 and/or controller 115 to request one or more advertisements from multiple advertisement servers 208 in a cascading manner.

In some embodiments, advertisement server 208 may interface with one or more advertisement providers. For example, upon receiving an advertisement request, advertisement handler 228 may access a list of advertisement providers and ping the advertisement provider for one or more advertisements. If, for example, a first advertisement provider does not provide the requested advertisement, advertisement handler 228 may be configured to ping the next advertisement provider on the list for the requested advertisement. The advertisement provider list may be updated at every load of the game.

In some embodiments, each advertisements may include one or more uniform resource locators (URLs) that are actionable by each end user. Accordingly, an advertisement may prompt end users to click on the displayed advertisement. In operation, advertisements may be requested after a player respawns, after a story video plays, or after an advertisement trigger occurs.

Web client application server 210 may be configured to provide a web site interface that links one or more player devices 102, 106 and/or controller 115 to interactive gaming platform 104. Web client application server 210 may include, for example, one or more web pages 232 and handler 234. Handler 234 may be configured to serve one or more web pages 232 to one or more player devices 102, 106 and/or controller 115 based on a received hyperlink transfer protocol request.

One or more player devices 102, 106 and/or controller 115 may request one or more web pages 232 from web client application server 210. Via one or more web pages 232, an end user may upload one or more videos to a particular interactive game space 150. Further, via one or more web pages 232, end users may modify or edit the one or more videos. For example, end users may record, load, edit, and apply effects to one or more videos via web page 232. Such exemplary effects may include, but are not limited to, video scan lines, tints, adding graphical elements like targeting reticules and science fiction jargon, sepia tone and the like. The effects may be used to make user videos fit with the aesthetics of the game. The effects may be applied such that the player generated video may be integrated into the video effects of the other videos in the database 226.

In some embodiments, one or more web pages 232 may be representative of a Wiki page corresponding to a game or interactive game space 150. Accordingly, end users may access one or more web pages 232 to upload content to a Wiki page, or a website that allows collaborative editing of its content and structure by its users. Uploaded content may include, for example, storylines, characters, world concepts, scripts, videos, and the like. An administrator may compile the uploaded content and develop story arcs, phases, computer code, and graphics that may be adapted into the storyline presented by interactive gaming platform.

Changes in the game state may be communicated by multiplayer server 204 to player devices 102, 106 as well as display device 111. In one embodiment, multiplayer server 204 may use techniques such as dead reckoning in order to determine the location of player-controlled objects in advance of multiplayer server 204 communicating changes in game state to player devices 102, 106 and display device 111.

AI server 212 may be configured to manage a storyline and one or more characters or avatars in each interactive game space 150. AI server 212 may include at least character development (dev.) module 236 and story map module 238. Character development module 236 and story map module 238 may work in conjunction to manage a story being conveyed by a game in interactive game space 150.

Character development module 236 may be configured to generate one or more characters to be included in interactive game space 150. Conventionally, systems use bots to populate its servers with opponents to play against. In conventional systems, gaming storylines have the tendency to repeat themselves, because characters are limited to a fixed number of responses to different activation triggers. Character module 236 addresses this limitation of conventional systems by generating characters that are configured to respond to user voice and actions and changes in the game world, with a range of behaviors and dialogue in situations that may not have been anticipated by developers and to do so in such a way as to reveal their characters and the world the inhabit in a consistent fashion. The game may be structured into a series of storypoint nodes. Each storypoint node may include media (and associated triggers), game state and character changes, as well as one or more end triggers. For each storypoint node, each character may have a rule set. A rule set may include potential character behavior, dialogue, and personal goal set the character uses in determining which behavior and/or dialogue to utilize. In response to player device 102, 106 actions and/or voice input (and any other changes to virtual game space 150), characters may select from their behaviors based on their goal set, and couple the selected behavior with dialogue chosen from the rule set.

Each character may be individually designed to represent a character in the story, including how the character behaves in response to user input and the state of the game, and in the creation of dialogue and pre-rendered video communications, giving characters physical and behavioral characteristics and goals in the game. Character development module 236 may also design characters to remember past events and alter their behaviors based on prior user action, success of particular actions, and the like. In other words, character development module 236 may generate characters that are capable of responding intelligently to end user input. Much like players, characters may control objects in virtual game space 150 and deliver dialogue through one or more video files retrieved from video server 206 and delivered to one or more player devices 102, 106.

Character responses may not be tied to a particular player device 102, 106 input, but rather, may be selected based on a determination of player device's 102, 106 intent from voice input and/or other actions. Character development module 236 may leverage a character algorithm to select which of its available behaviors (and related) are most likely to accomplish its current goal set. Character development module 236 may design character goals to create conflict and reveal character backstories as player devices 102,106 interact with the characters. As a result, player devices 102,106 may learn about the world represented in virtual game space 150 from characters' actions and dialogue, which may be initiated by the protagonists' journey through the world. Such storytelling is similar to that in a novel, movie, television show, and the like. However, in virtual game space 150, each player device 102, 106 may be a protagonist in the story; rather than merely an observer, as in traditional storytelling.

Story map module 238 may generate a backbone or structure of the interactive game space 150. In other words, story map module 238 may be configured to generate a story terrain map which encompasses one or more story structures, each a storypoint node, based on aggregate player actions in the game world. Generally, each story may include one or more phases and one or more storypoint nodes, wherein completion of a given phase results in the start of another storypoint node. The story terrain map differs from conventional gaming stories in that phases of the story terrain map do not include a single end condition; rather, each phase may include a series of end-triggers, each of which may lead to a subsequent storypoint node, and so on. Taken together, storypoint nodes may dictate the narrative and gameplay possibilities available at each phase of the game. Storypoint nodes may be chained together by end-triggers, with multiple possible end triggers within each storypoint node, thereby creating a web of pathways through all possible storylines in the game. The complete set of storypoint nodes in a game, and the manner in which they are connected, may be represented in the story terrain map. Story terrain maps, including the selection of nodal connections between particular storypoint nodes, may allow traditional storytelling structures to be combined with free-form gameplay. For example, multiple storypoint nodes, each with difficult challenges and character reveals, may connect in a hub and spoke formation to a lower-action storypoint node in order to build rising action that leads to a narrative climax regardless of which "spoke" is activated. As groups of players initiate end-triggers and traverse the story terrain map together in a game session, the players may experience a set of changing game play and character response conditions resulting in a highly structured story that, nevertheless, reflects their free-form multiplayer game play within each storypoint node or phase.

Story map module 238 may mark phases by changes in the state of the game, but also by changes in the state of every character in interactive game space 150. For example, based on a user action, a character's dialog sets, abilities, and behaviors may change. In some embodiments, the character's goals for a given phase may also change. In this way, story map module 238 may create one or more ways in which characters may evolve and reveal themselves in unexpected ways, while, at the same time, goals for a particular phase may be designed to drive end user experience in a particular direction. Accordingly, the outcome of a phase or the overall game may be variable, based on one or more of end user action, character action, which characters and end users are playing, prior end user action, and the like. Further, a pairing between each end user and each character may alter the experiences of the story, which may lead to high replayability of the game.

The story terrain map generated by story map module 238 differs from traditional interactive story decision trees in that the story terrain map enables the characters in virtual game space 150 to response to unanticipated situations with behaviors and dialogue that are not predetermined, while maintaining a consistent characterization. Unanticipated situations that may arise during game play may be logged and reported by, for example, matchmaking server 202, AI server 212, etc., thereby enabling developers to create new storypoint nodes, rule sets, and dialogue which contribute to the growth of characters and the world in response to player device 102, 106 activity. Additionally, by moving the game to different storypoint nodes in response to multiple player devices' 102, 106 combined actions in the game (i.e., storypoint end triggers), and changing each characters' configuration at each node shift, characters and the story may be seen to evolve in response to multiple player devices' 102, 106 action and dialogue, while remaining true to the author's (or developer's) intent.

Figure 10:
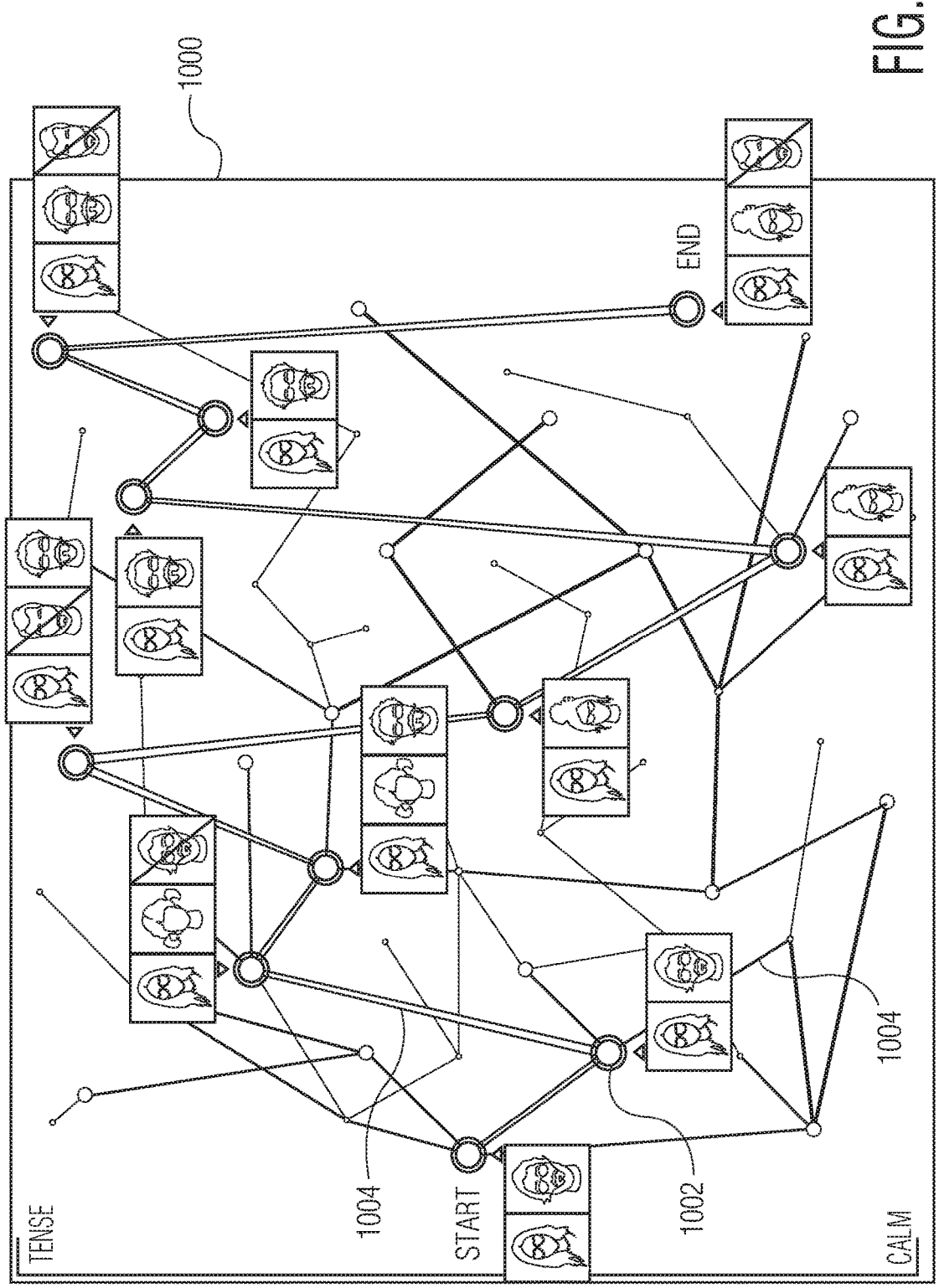
FIG. 10 is an example story terrain map of a multiplayer virtual game space, according to example embodiments.
Figure 11A:
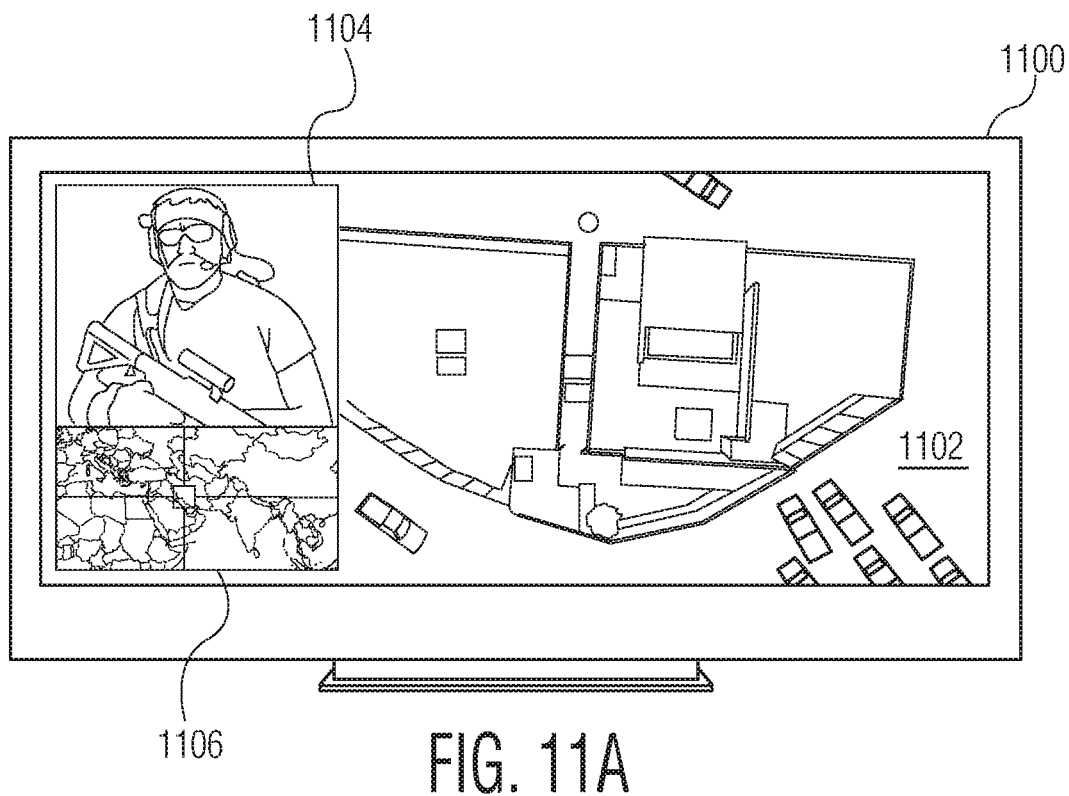
FIGS. 11A, 11B, and 11C are exemplary graphical user interfaces (GUIs) illustrating a multiplayer game, according to example embodiments.
Figure 11B:
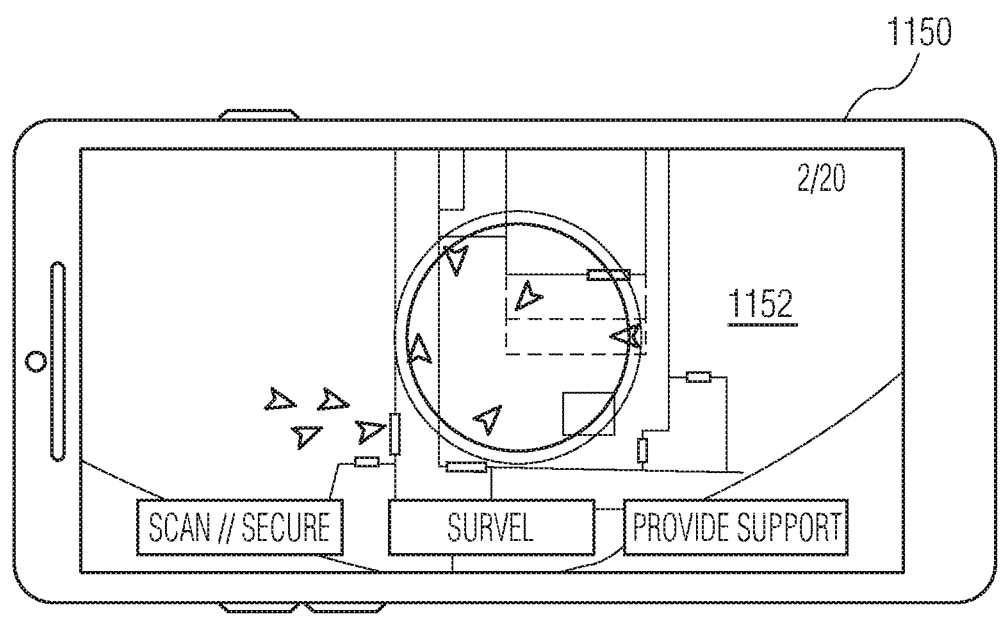
Figure 11C:
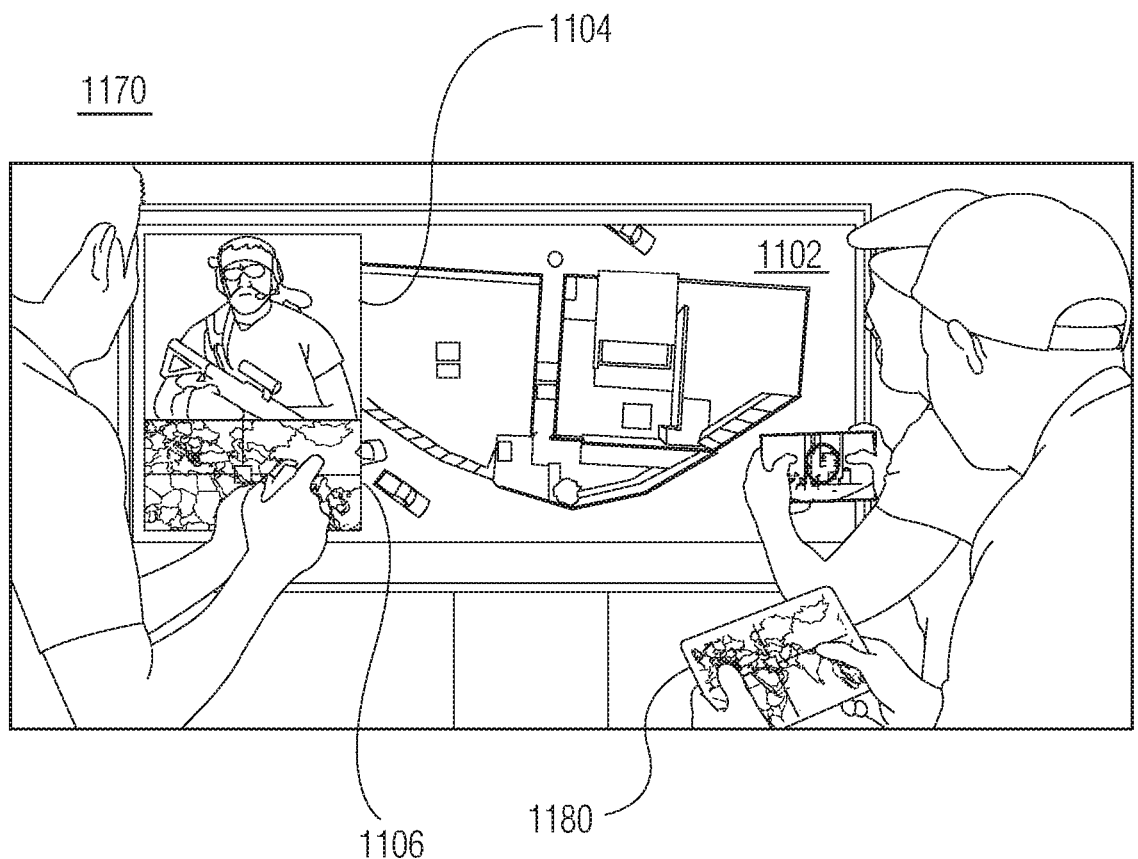

FIG. 10 is an example story terrain map 1000, according to example embodiments. Story terrain map 1000 is an exemplary map illustrating a storyline that may be a backbone of a game in virtual game space 150. As illustrated, story terrain map 1000 may include one or more storypoint nodes 1002. Stemming from each storypoint node 1002, may be one or more paths 1004 that a player device (102, 106) may choose to take. As illustrated, each storypoint node 1002 may have several paths 1004, which may lead to several different storypoint nodes 1002. Accordingly, the aggregate actions of all player devices 102, 106 at a storypoint node 1002 early in the storyline may lead to a different path through the story terrain map and greatly affect the storyline. Nevertheless, each path 1004 may represent a structured story with consistent, evolving characters and may reveal different aspects of a consistent story world. Iterating through each possibility may provide end users with a high rate of game replayability.

It is important to note how interactive gaming platform 104 is configured differently from conventional multiplayer gaming systems. First, consider massive multiplayer online games (MMOs). MMOs typically use quests/missions to create an exposition. Generally, in an MMO, the environment (or world) does not change; however, in some MMOs a trigger (e.g., a location based like riding into a new town and meeting a new character) may initiate an activity that might include an interstitial or monologue from a character to set up a scene, and a set of goals (for the player) to "win" the interaction. Within the interaction, the player is typically scored against the mission goals, and dialogue from characters proceeds deterministically based on user action, dialogue, and, in some cases, utilizing a log of previous user actions. When the quest is complete, there is typically a closing interstitial or dialogue, and players may proceed to finding the next mission. The heart of the game is in locating and completing quests and experiencing the world through dialog and behavior of characters within these quests.

While conceivably quests may be chained together to create complex narratives, it becomes increasingly complex to manage storylines in an MMO as each point of dialogue becomes a potential influence on future events and character attitudes. This is because decision trees become impossibly broad as users take different paths through a story—a problem which is increased in the massive multiplayer environment in which players' every action must be considered in determining story direction at the end of a long tale. It would simply be impossible or near impossible to write and create media for a complex story with multiple characters, multiple storylines, and multiple simultaneous players.

Accordingly, current MMO methods are limited as story vehicles due to internal complexity as stories scale in depth and number of players. As a consequence, exposition and character are often done in interstitials and monologues (i.e., not in gameplay, but in the traditional linear movies sections.) While character may react to user actions in game, they are limited to a narrow set of responses to player activity.

Interactive gaming platform 104 addresses the limitations of traditional multiplayer systems, by providing an environment backed by an improved story terrain map that includes AI characters that may not only participate in a predefined storyline, but are also able to flexibly respond to game state and human input. In this way, players may impact the interactive game space 150 through their own actions, but all elements work together to ensure events illuminate a crafted story world, rather than rending the story with actions inconsistent with or impossible in the world.

Using a specific example, interactive gaming platform 104 may be able to efficiently respond to an aggressive game play (e.g., a player slaughtering innocent characters). In conventional systems, players who do something out of character might be summarily killed by the system in a dens ex machina way. In another example, such as that in MMO systems, the platform may punish that activity lowering the player's "moral rating" or similar. Such issues would not present themselves in virtual game space 150. For example, if the authors had not anticipated an event like this, the character development module 236 may flag unanticipated activities and a new "storypoint" can be crafted and inserted into the story map module 238. Accordingly, the new storypoint may be made available to all users without a new download of software. As a result of such action, in virtual game space 150, characters may now be able to respond in-character and a natural storyline would emerge from such an event. Continuing with the example above, for instance, a player might now be given a red laser sword by a mysterious Evil Mentor and led on a journey; other players would hear rumors of a new wicked apprentice and characters may begin hording magic power crystals. This new storyline may create narrative and gameplay conditions for all players using devices 102, 106 and/or display device 111 connected to the game, thereby improving player experiences in response to unanticipated player action.

Referring back to FIG. 2, interactive gaming platform 104 is able to achieve such functionality through AI server 212. Character development module 236 may develop AI characters that respond to player activity independently and not as a complex whole decision tree involving multiple characters at once. The independent AI characters may be configured with various dialogue and behaviors, and can choose among them by reference to "goals." The interaction between independent AI characters may create conflict and story, which may result in opportunities to discuss and reveal elements of virtual game space 150. By creating multiple storypoint outcomes (each a storypoint triggered by a set of end-conditions defined at each storypoint) interactive gaming platform 104 may allow multiple users interacting with the world to move a story forward in a way that is natural, reveals new elements of a pre-authored world, and that reflects their actions within the story.

Figure 3:
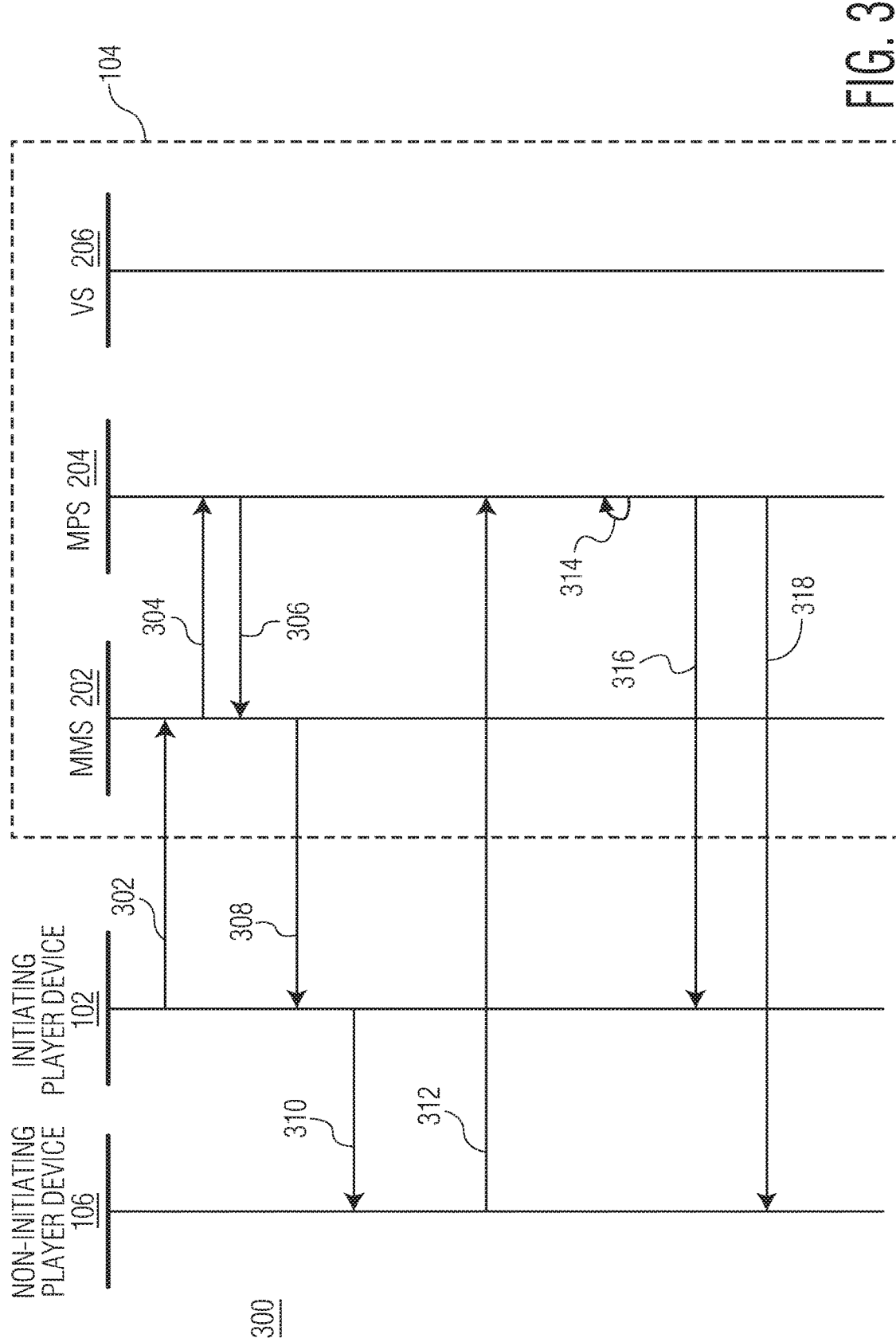
FIG. 3 is a signal flow diagram illustrating example communication among one or more components of the computing environment of FIG. 1, according to example embodiments.

FIG. 3 is a signal flow diagram 300 illustrating example communication among one or more components of the computing system 100 of FIG. 1, according to example embodiments. Signal flow diagram 300 may represent one or more operations that may be involved in initiating player device 102 and non-initiating player device 106 gaining access to virtual game space 150.

At operation 302, initiating player device 102 may register and/or log-in to an account with interactive gaming platform 104. As illustrated, initiating player device 102 may request access to virtual game space 150. For example, initiating player device 102 may request access to virtual game space from matchmaking server (MMS) 202. In some embodiments, initiating player device 102 may gain access to interactive gaming platform 104 via application 114 executing thereon.

At operation 304, matchmaking server 202 may match initiating player device 102 to a particular games space 150. Matchmaking server 202 may leverage matching algorithm 214 to match initiating player device 102 to a particular instance of multiplayer server (MPS) 204 and assign initiating player device 102 to a particular game space 150. Matchmaking server 202 may request from multiplayer server 204 an identification code associated with the identified instance of multiplayer server 204.

At operation 306, multiplayer server 204 may identify the identification code associated with the identified instance of multiplayer server 204. In other words, the identification code may correspond to the particular virtual game space 150 assigned to initiating player device 102. Multiplayer server 204 may transmit the unique identification code associated with the identified server instance.

At operation 308, matchmaking server 202 may transmit the received identification code to initiating player device 102. The identification code may be used by initiating player device 102 to allow one or more non-initiating player devices 106 to gain access to virtual game space 150.

At operation 310, initiating player device 102 may transmit the received identification code to one or more non-initiating player devices 106. In some embodiments, initiating player device 102 may electronically transmit the received identification code to one or more non-initiating player devices 106. In some embodiments, an end user associated with initiating player device 102 may verbally transmit the identification code to one or more end users associated with one or more non-initiating player devices 106.

At operation 312, non-initiating player device 106 may attempt to join virtual game space 150. In some embodiments, such as that shown, non-initiating player device 106 may communicate directly with multiplayer server 204 to join the particular virtual game space 150. In some embodiments, non-initiating player device 106 may communicate indirectly with multiplayer server 204, by communicating with matchmaking server 202. Non-initiating player devices 106 may join interactive game space 150 by providing multiplayer server 204 with the received identification code. In some embodiments, the identification code is representative of a server (e.g., serverID). In some embodiments, the identification code is representative of controller 115 rendering a main screen for a unit or team (e.g., unitID) (e.g., on display 111). For example, the serverID may link to a game space where each player device 102, 106 is playing the same military game, while the unitID may link to a particular military fire team within virtual game space 150.

At operation 314, multiplayer server 204 may process the request from non-initiating device 106. For example, multiplayer server 204 may parse the received identification code to determine how to provide access to non-initiating device 106. In some embodiments in which the identification code is representative of a controller, multiplayer server 204 may associate non-initiating player device 106 with a unit or team associated with the identification code. In some embodiments in which the identification code is representative of a server, multiplayer server 204 may more generally associate non-initiating player device 106 with interactive games space 150.

At operation 316, multiplayer server 204 may provide initiating player device 102 with access to interactive game space 150. For example, multiplayer server 204 may transmit an internet protocol (IP) address to initiating player device 102, which corresponds to a specific server instance associated with interactive game space 150.

At operation 318, multiplayer server 204 may provide non-initiating player device 106 with access to interactive game space 150. For example, multiplayer server 204 may transmit an IP address to non-initiating player device 106, which corresponds to a specific server associated with interactive game space 150.

FIG. 4 is a signal flow diagram 400 illustrating example communication among one or more components of the computing system 100 of FIG. 1, according to example embodiments. Signal flow diagram 400 may represent one or more operations that may be taken while initiating player device 102 and non-initiating player device 106 interact within virtual game space 150.

At operation 402, multiplayer server 204 may instruct initiating player device 102 to request one or more videos from video server (VS) 206. For example, multiplayer server 204 may determine that a trigger event has occurred and, as a result, a video corresponding to the trigger event should be played. In some embodiments, multiplayer server 204 may instruct initiating player device 102 to request a specific video from video server 206. In some embodiments, multiplayer server 204 may instruct initiating player device 102 to request a type of video from video server 206. Exemplary triggers may be, for example:

Act 1
   Video(TriggerX, RoleY)
   Video(TriggerX, RoleZ)
   Video(TriggerY, RoleY)
   Video(TriggerZ, RoleY)
Act 2
   Video(TriggerX, RoleY)
   Video(TriggerX, RoleZ)
   Video(TriggerY, RoleY)
   Video(TriggerZ, RoleY)

At operation 404, multiplayer server 204 may instruct non-initiating player device 106 to request one or more videos from video server 206. For example, multiplayer server 204 may determine that a trigger event has occurred and, as a result, a video corresponding to the trigger event should be played. In some embodiments, multiplayer server 204 may instruct non-initiating player device 106 to request a specific video from video server 206. In some embodiments, multiplayer server 204 may instruct non-initiating player device 106 to request a type of video from video server 206. In some embodiments, the instructions transmitted to non-initiating player device 106 may differ from the instructions transmitted to initiating plyer device 102. In other words, multiplayer server 204 may instruct initiating player device 102 to request a video that differs from the video non-initiating player device 106 was instructed to request. A similar operation may be performed when a character in virtual game space 150 initiates video playback (e.g., a character speaks with a player device 102, 106). AI server 212 may send an instruction to initiate a similar action, e.g., instruct initiating player device 102 and/or non-initiating player device 106 to request one or more videos from video server 206.

At operation 406, initiating player device 102 may request one or more videos from video server 206. For example, initiating player device 102 may request one or more videos from video server 206 in accordance with instructions received at operation 402.

At operation 408, non-initiating player device 102 may request one or more videos from video server 206. For example, initiating player device 102 may request one or more videos from video server 206 in accordance with instructions received at operation 404.

At operation 410, video server 206 may process the request from initiating player device 102. For example, video handler 224 may parse the request to identify one or more videos in the request. Video handler 224 may query database 226 to retrieve the one or more videos. Video server 206 may transmit the one or more videos to initiating player device 102 for rendering and display.

At operation 412, video server 206 may process the request from non-initiating player device 106. For example, video handler 224 may parse the request to identify one or more videos in the request. Video handler 224 may query database 226 to retrieve the one or more videos. Video server 206 may transmit the one or more videos to non-initiating player device 106 for rendering and display.

At operation 414, multiplayer server 204 may continually monitor non-initiating player device 106 and initiating player device 102 during game play. For example, multiplayer server 204 may aggregate one or more actions by non-initiating player device 106 and/or initiating player device 102 during a phase or level of the game. Such actions may relate to, for example, interactive game space 150 having a player who takes the role of a captain that is responsible for steering a spaceship, another player may take the role of a navigator that is responsible for providing the captain with the coordinates for the spaceship, and yet another player may take the role of a weapons specialist that is responsible for selecting the proper weapon, etc. Together the players must perform their individual tasks/actions associated with their role properly in order for the aggregate of the actions to meet a trigger event such as destroying an enemy spaceship.

At operation 416, multiplayer server 204 may continually aggregate and analyze one or more actions performed during gameplay to determine whether the actions correspond to satisfying a trigger event. Continuing with the above example, the trigger event may be destroying the enemy ship.

After the trigger event is met (e.g., the enemy spaceship is destroyed), multiplayer server 204 may provide player devices 102, 106 with a new portion of the game's storyline. The new portion of the game's storyline may be accompanied by a new set of videos retrieved from video server 206. In some embodiments, the new portion of the game's storyline may include a video that is configured to be displayed on display device 111 so that it is viewed by all the players participating in virtual game space 150. The new portion of the game's storyline may also include targeted videos that are configured to be displayed on the displays of the player devices in accordance with their respective roles. For example, a player that takes the role of Spiderman may receive a video from Mary Jane. While each of the players participating in the game space may receive and view a different video on their player device, the received videos may be consistent with each other and present aspects of a single coherent storyline (corresponding to the game space) in various points-of-view. The displayed videos may summarize the player's accomplishments and inform and motivate the players to continue with the next phase of the storyline.

Accordingly, at operation 418, multiplayer server 204 may instruct initiating player device 102 to request one or more videos from video server 206. For example, multiplayer server 204 may determine that the trigger event has occurred and, as a result, a video corresponding to the trigger event should be played. In some embodiments, multiplayer server 204 may instruct initiating player device 102 to request a specific video from video server 206. In some embodiments, multiplayer server 204 may instruct initiating player device 102 to request a type of video from video server 206.

At operation 420, multiplayer server 204 may instruct non-initiating player device 106 to request one or more videos from video server 206. For example, multiplayer server 204 may determine that the trigger event has occurred and, as a result, a video corresponding to the trigger event should be played. In some embodiments, multiplayer server 204 may instruct non-initiating player device 106 to request a specific video from video server 206. In some embodiments, multiplayer server 204 may instruct non-initiating player device 106 to request a type of video from video server 206. In some embodiments, the instructions transmitted to non-initiating player device 106 may differ from the instructions transmitted to initiating plyer device 102. In other words, multiplayer server 204 may instruct initiating player device 102 to request a video that differs from the video non-initiating player device 106 was instructed to request.

At operation 422, initiating player device 102 may request one or more videos from video server 206. For example, initiating player device 102 may request one or more videos from video server 206 in accordance with instructions received at operation 402.

At operation 424, non-initiating player device 102 may request one or more videos from video server 206. For example, initiating player device 102 may request one or more videos from video server 206 in accordance with instructions received at operation 402.

At operation 426, video server 206 may process the request from initiating player device 102. For example, video handler 224 may parse the request to identify one or more videos in the request. Video handler 224 may query database 226 to retrieve the one or more videos. Video server 206 may transmit the one or more videos to initiating player device 102 for rendering and display.

At operation 428, video server 206 may process the request from non-initiating player device 106. For example, video handler 224 may parse the request to identify one or more videos in the request. Video handler 224 may query database 226 to retrieve the one or more videos. Video server 206 may transmit the one or more videos to non-initiating player device 106 for rendering and display.

FIG. 5A is a signal flow diagram 500 illustrating example communication among one or more components of the computing system 100 of FIG. 1, according to example embodiments. Signal flow diagram 500 may represent one or more operations that may be performed while initiating player device 102 and non-initiating player device 106 interact within virtual game space 150.

At operation 502, initiating player device 102 may capture a video using camera 112 associated therewith. In some embodiments, the video may include one or more sets of audio and or visual data corresponding to a message directed to one or more end users associated with virtual game space 150. In other words, the video may correspond to a video message with one or more intended recipients. In some embodiments, initiating player device 102 may process the video, such that the video is compatible with video server 206. For example, initiating player device 102 may convert the video from an .mp4 format to a graphics interchange format (GIF).

At operation 504, initiating player device 102 may transmit the video to multiplayer server 204. In some embodiments, initiating player device 102 may transmit the video to multiplayer server 204 via web client application server 210. The video transmission may include one or more parameters associated with the video. Such parameters may include, for example, one or more intended recipients.

At operation 506, multiplayer server 204 may, optionally, analyze the video to determine whether the video includes any sensitive material. For example, multiplayer server 204 may make the video available to a third party administrator such that the third party administrator may watch the video, to ensure that the video is appropriate for its intended audience.

At operation 508, multiplayer server 204 may transmit the video to video server 206 for storage. For example, video module 220 may instruct video handler 224 to store the received video in database 226.

At operation 510, multiplayer server 204 may instruct non-initiating player device 106 (e.g., the intended recipient) to request the video from video server 206. At operation 512, non-initiating player device 102 may request the video from video server 206. At operation 514, video server 206 may process the request from non-initiating player device 106. For example, video handler 224 may parse the request to identify the video in the request. Video handler 224 may query database 226 to retrieve the video. Video server 206 may transmit the video to non-initiating player device 106 for rendering and display.

In some embodiments, player devices 102, 106 that receive a recorded video may display a notification that a video has been sent to the player, and the player may be prompted to elect whether they wish to accept or reject the video. Only after a player has elected to accept the video, may a video be displayed and viewed on the player device 102, 106 and/or display device 111. In some embodiments, player devices 102, 106 may include software allowing a player to report inappropriate content on a received video to interactive gaming platform 104.

Figure 5B:
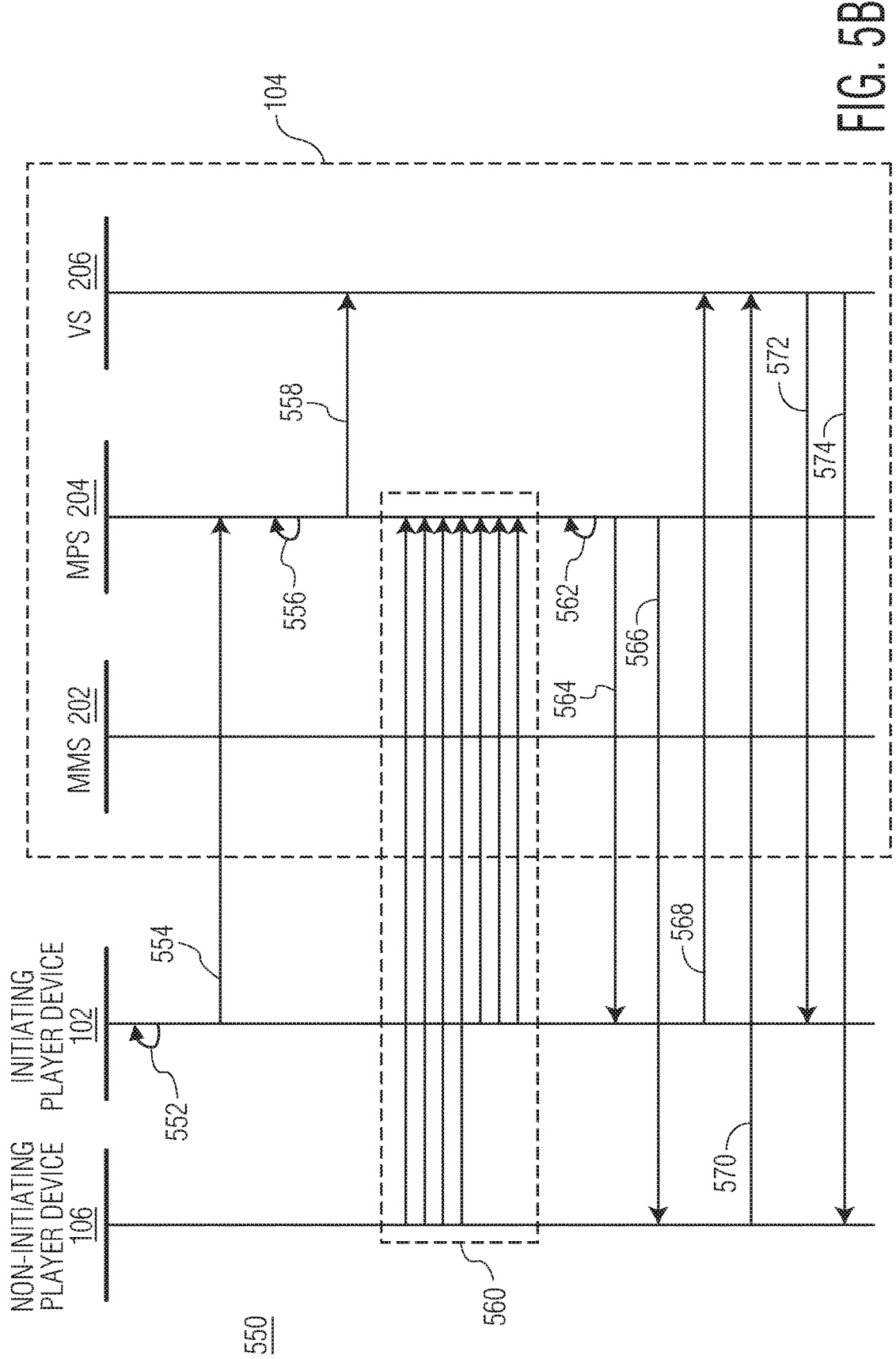
FIG. 5B is a signal flow diagram illustrating example communication among one or more components of the computing environment of FIG. 1, according to example embodiments.

FIG. 5B is a signal flow diagram 550 illustrating example communication among one or more components of the computing system 100 of FIG. 1, according to example embodiments. Block diagram 550 may represent one or more operations that may be performed while initiating player device 102 and non-initiating player device 106 interact within virtual game space 150.

At operation 552, initiating player device 102 may capture a video using camera 112 associated therewith. In some embodiments, the video may include one or more sets of audio and or visual data corresponding to a message directed to one or more end users associated with virtual game space 150. In other words, the video may correspond to a video message with one or more intended recipients. In some embodiments, initiating player device 102 may process the video, such that the video is compatible with video server

206. For example, initiating player device 102 may convert the video from an .mp4 format to a graphics interchange format (GIF).

At operation 554, initiating player device 102 may transmit the video to multiplayer server 204. In some embodiments, initiating player device 102 may transmit the video to multiplayer server 204 via web client application server 210. The video transmission may include one or more parameters associated with the video. Such parameters may include, for example, one or more triggering conditions associated with the video. Accordingly, the user's recorded video may be included in virtual game space 150 upon activation of a trigger event.

At operation 556, multiplayer server 204 may, optionally, analyze the video to determine whether the video includes any sensitive material. For example, multiplayer server 204 may make the video available to a third party administrator, such that the third party administrator may watch the video to ensure that the video is appropriate for its intended audience.

At operation 558, multiplayer server 204 may transmit the video to video server 206 for storage. For example, video module 220 may instruct video handler 224 to store the received video in database 226.

At operation 560, multiplayer server 204 may continually monitor non-initiating player device 106 and initiating player device 102 during game play. For example, multiplayer server 204 may aggregate one or more actions by non-initiating player device 106 and/or initiating player device 102 during a phase or level of the game.

At operation 562, multiplayer server 204 may continually aggregate and analyze one or more actions performed during gameplay to determine whether the actions correspond to satisfying a trigger event. After the trigger event is met, multiplayer server 204 may provide player devices 102, 106 with a new portion of the game's storyline. The new portion of the game's storyline may be accompanied by a new set of videos retrieved from video server 206. Included in the new set of videos may be the video generated by the user in operation 552.

At operation 564, multiplayer server 204 may instruct initiating player device 102 to request the uploaded video from video server 206. For example, multiplayer server 204 may determine that the trigger event associated with the uploaded video has occurred and, as a result, the video corresponding to the trigger event should be played.

At operation 566, multiplayer server 204 may instruct non-initiating player device 106 to request the uploaded video from video server 206. For example, multiplayer server 204 may determine that the trigger event associated with the uploaded video has occurred and, as a result, the video corresponding to the trigger event should be played.

At operation 568, initiating player device 102 may request the uploaded video from video server 206. For example, initiating player device 102 may request the uploaded video from video server 206 in accordance with instructions received at operation 564.

At operation 570, non-initiating player device 102 may request the uploaded video from video server 206. For example, initiating player device 102 may request the uploaded video from video server 206 in accordance with instructions received at operation 566.

At operation 572, video server 206 may process the request from initiating player device 102. For example, video handler 224 may parse the request to identify video in the request. Video handler 224 may query database 226 to retrieve the uploaded video. Video server 206 may transmit the uploaded video to initiating player device 102 for rendering and display.

At operation 574, video server 206 may process the request from non-initiating player device 106. For example, video handler 224 may parse the request to identify the video in the request. Video handler 224 may query database 226 to retrieve the uploaded video. Video server 206 may transmit the uploaded video to non-initiating player device 106 for rendering and display.

FIG. 6 is a signal flow diagram 600 illustrating example communication among one or more components of the computing system 100 of FIG. 1, according to example embodiments. Signal flow diagram 600 may represent one or more operations that may be performed while initiating player device 102 and non-initiating player device 106 interact within virtual game space 150.

At operation 602, multiplayer server 204 may submit an advertisement call to advertisement server (AS) 208. The advertisement call may include a request to receive an advertisement from advertisement server 208. In some embodiments, the advertisement call may include one or more parameters. Such parameters may include a type of advertisement, a vendor associated with the advertisement, a size of the advertisement, and the like.

At operation 604, advertisement server 208 may process the advertisement call received from multiplayer server 204. For example, advertisement server 208 may identify the one or more parameters specified by multiplayer server 204 in the advertisement call. In some embodiments, advertisement server 208 may retrieve an advertisement, locally, from database 230. In some embodiments, advertisement server 208 may request an advertisement from a third party advertisement system.

At operation 606, advertisement server 208 may transmit an advertisement to multiplayer server 204. The advertisement may satisfy the one or more parameters associated in the advertisement call.

At operation 608, multiplayer server 204 may transmit the advertisement to initiating player device 102. At operation 610, multiplayer server 204 may transmit the advertisement to non-initiating player device 106.

Figure 7:
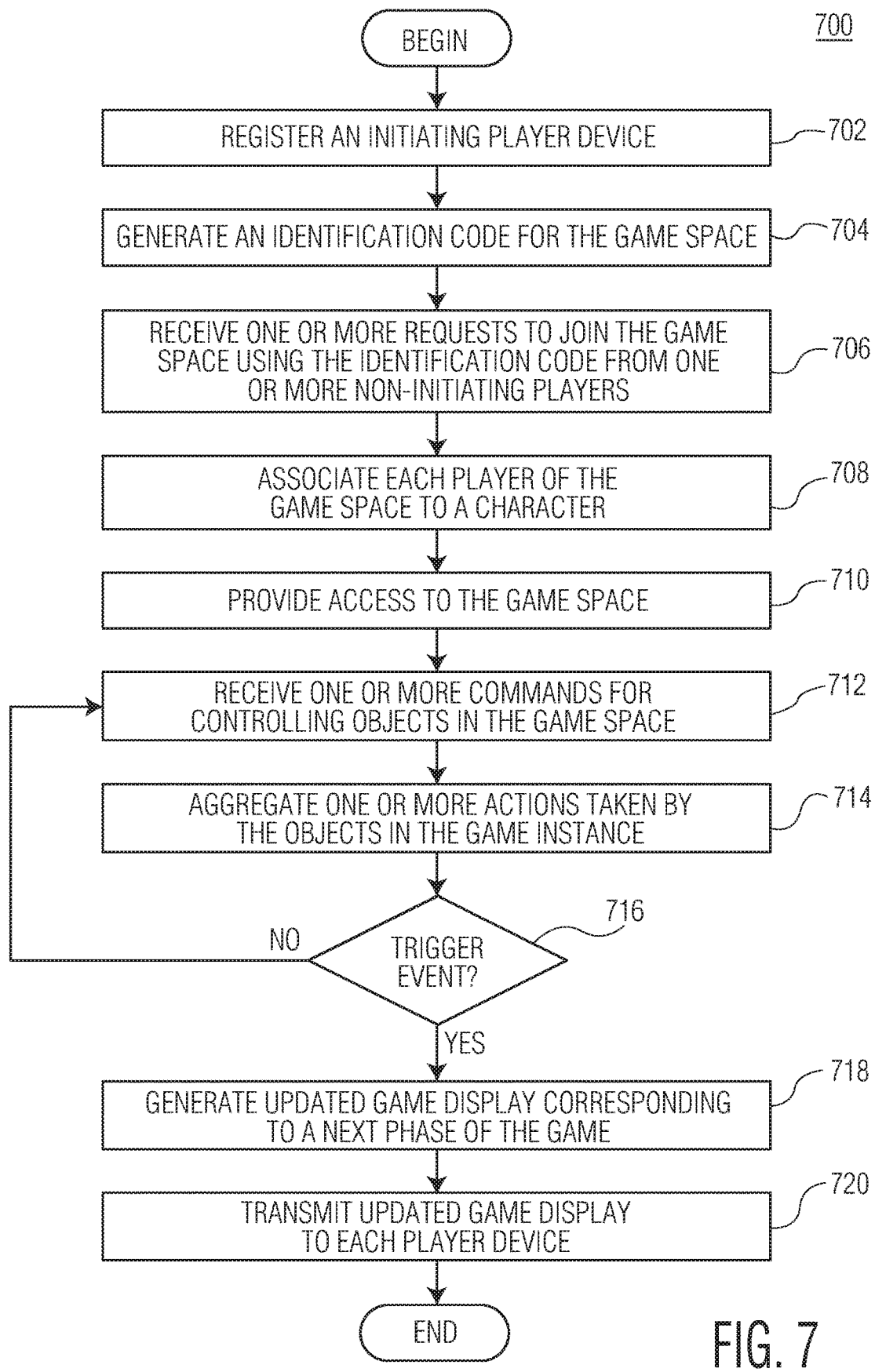
FIG. 7 is a flow diagram illustrating an example method of providing an interactive and social gaming experience, according to example embodiments.

FIG. 7 is a flow diagram illustrating a method 700 of managing an interactive game space, which may be implemented by interactive gaming platform 104, according to example embodiments. FIG. 7 is described with respect to FIGS. 1 and 2. Method 700 may begin at step 702.

At step 702, interactive gaming platform 104 may register initiating player device 102. For example, matchmaking server 202 may receive a request from initiating player device 102 to gain access to or create a particular interactive game space 150. Matchmaking server 202 may register or match initiating player device 102 with a particular instance of multiplayer server 204 corresponding to the particular interactive game space 150.

At step 704, interactive gaming platform 104 may generate an identification code corresponding to the particular interactive gaming space 150. In some embodiments, matchmaking server 202 may generate the identification code corresponding to the interactive game space 150. In some embodiments, multiplayer server 204 may generate the identification code. In some embodiments, the identification code is representative of a server (e.g., serverID). In some embodiments, the identification code is representative of controller 115 rendering a main screen (e.g., on display 111) for a unit or team (e.g., unitID). For example, the serverID may link to virtual game space 150 where each player device 102, 106 is playing the same military game, while the unitID may link to a particular military fire team within virtual game space 150. The identification code may be subsequently used by non-initiating player device 106 to join initiating player device 102 in virtual game space 150.

At step 706, interactive gaming platform 104 may receive one or more requests to join interactive game space 150 from one or more non-initiating player devices 106. The one or more requests may generally include at least the identification code communicated from initiating player device 102 to one or more non-initiating player devices 106.

At step 708, interactive gaming platform 104 may associate each player devices 102, 106 with a particular role or character in virtual game space 150. In some embodiments, multiplayer server 204 may assign each player device 102, 106 a particular role. For example, based on computing specifications of a particular player device (102, 106), interactive gaming platform 104 may assign each player device 102, 106 a direct or non-direct role. In some embodiments, multiplayer server 204 may prompt each player device 102, 106 to choose a role and/or character in virtual game space 150.

At step 710, interactive gaming platform 104 may provide player devices 102, 106 with access to the game space. For example, multiplayer server 204 may initiate the game represented by virtual game space 150, by transmitting one or more frames of the game to player devices 102, 106 (and/or to controller 115) for rendering and display.

At step 712, interactive gaming platform 104 may receiving one or more commands for controlling objects in virtual game space 150. For example, multiplayer server 204 may continually monitor non-initiating player device 106 and initiating player device 102 during game play. Multiplayer server 204 may identify one or more commands for controlling one or more objects in virtual game space 150 from one or more of player devices 102, 106.

At step 714, interactive gaming platform may aggregate one or more actions taken by the objects in virtual game space 150. For example, multiplayer server 204 may continually aggregate and analyze one or more actions performed during gameplay to determine whether the actions correspond to satisfying a trigger event.

At step 716, interactive gaming platform 104 may determine whether a trigger event has been met. If, at step 716, interactive gaming platform 104 determines that a trigger event is not met, then step 716 proceeds to step 712.

If, however, interactive gaming platform 104 determines that the trigger event has been met, at step 718, multiplayer server 204 may generate an updated game display to provide player devices 102, 106 with a new portion of the game's storyline. The new portion of the game's storyline may be accompanied by a new set of videos retrieved from video server 206. At step 720, interactive gaming platform 104 may transmit the updated game display to each of player devices 102, 106 (and, in some examples, controller 115).

For example, if the players in virtual game space 150 collaborate to destroy an enemy spaceship, a video may appear depicting a fictional character from the game. Within the multiplayer game space, the multiplayer server 104 may aggregate the actions taken by each individual player and determine whether the aggregate of the actions may meet a trigger action (e.g., event). For example, the game may correspond to a space epic adventure and a triggering action (event) may include when a space station is destroyed by an enemy. In this example, the videos on the video server 206 including the space station and the characters who lived on the space station are no longer necessary for the space epic adventure, as they have been destroyed by the enemy. Accordingly, multiplayer server 204 may provide a motivational video to one or more of player devices 102, 106 encouraging the players to seek revenge and provide a new objective to the players. For example, in connection with the space epic adventure, the players object may change from defending the space station to attacking the enemy with superior lasers, or retreating. Multiplayer server 204 may also display new videos on each player device corresponding with each player's role in the game space and the new phase of the game (that is responsive to the triggering action (event) of the space station being destroyed by an enemy). In this manner, triggering actions (events) may move the story line of the game forwards, and result in the display of a second set of videos.

Figure 8:
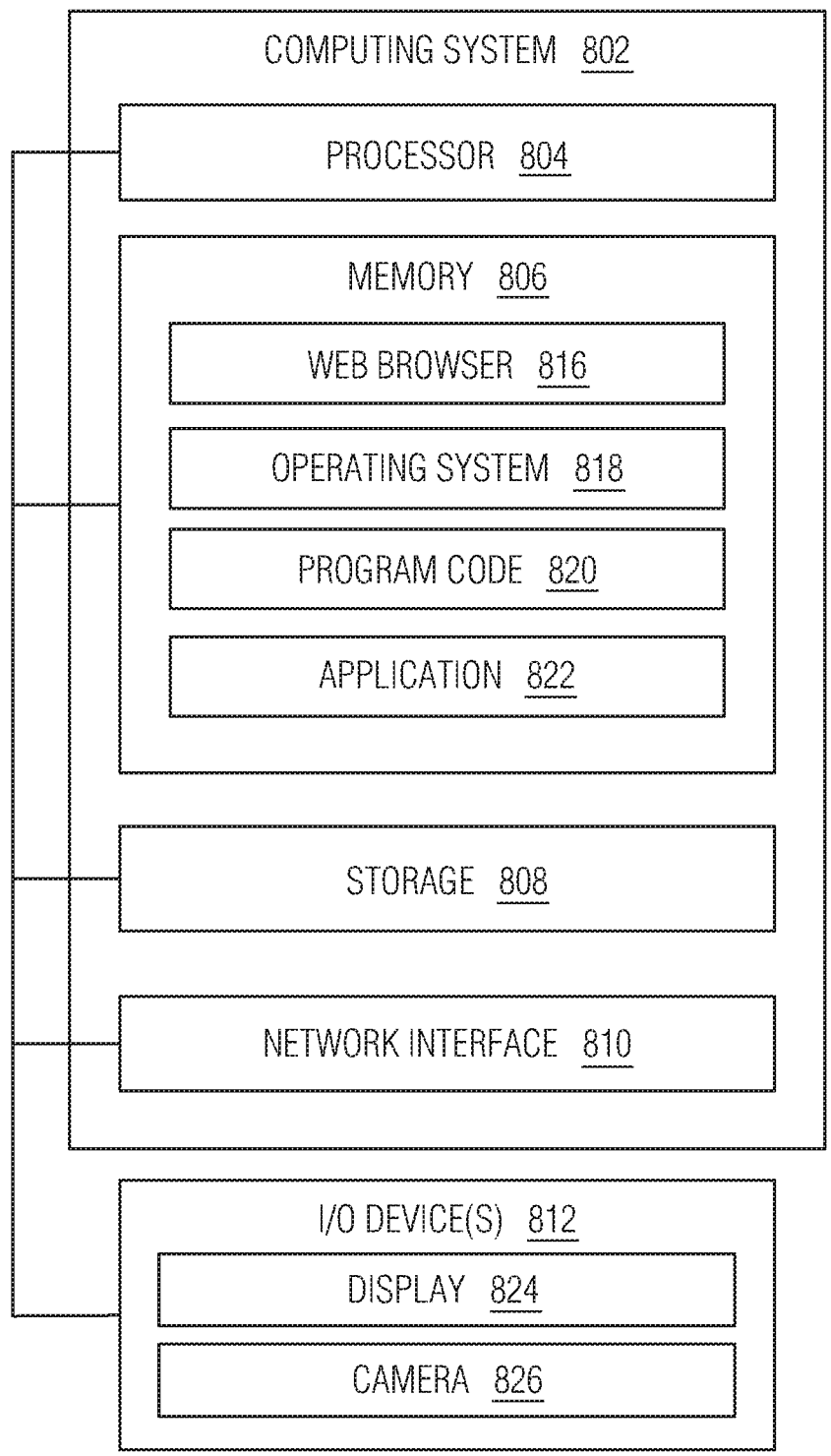
FIG. 8 is a functional block diagram illustrating an example computing system, according to example embodiments.

FIG. 8 is a functional block diagram illustrating an exemplary computing system 802, according to example embodiments. Computing system 802 may be representative of initiating player device 102 and non-initiating player device 106.

Computing system 802 may include processor 804, memory 806, storage 808, and network interface 810. In some embodiments, computing system 802 may be coupled to one or more I/O device(s) 812. I/O devices 812 may include display 824 and camera 826. Although not shown, in some examples, computing system 802 may also include at least one microphone for capturing audio and/or at least one loudspeaker for outputting audio).

Processor 804 may retrieve and execute program code 820 (i.e., programming instructions) stored in memory 806. Processor 804 may also retrieve application data from application 822, stored in memory 822. Processor 804 may be included to be representative of a single processor, multiple processors, a single processor having multiple processing cores, and the like. Network interface 810 may be any type of network communications allowing computing system 802 to communicate externally via a computing network (e.g., network 105). For example, network interface 810 may be configured to enable external communication with interactive gaming platform 104.

Storage 808 may be, for example, a disk storage device. Although shown as a single unit, storage 808 may be a combination of fixed and/or removable storage devices, such as fixed disk drives, removable memory cards, optical storage, network attached storage (NAS), storage area network (SAN), and the like.

Memory 806 may include web browser 816, operating system 818, program code 820, and application 822. Program code 820 may be accessed by processor 804 for processing (i.e., executing program instructions). Program code 820 may include, for example, executable instructions for communicating with other computing devices to display one or more pages of a website, via web browser 816. Application 822 may enable a user of computing system 802 to access a functionality of interactive gaming platform 104. For example, application 822 may access content managed by interactive gaming platform 104, such as a particular virtual game space 150. The content that is displayed to a user of computing system 802 may be transmitted from interactive gaming platform 104 to computing system 802, and subsequently processed by application 822 for display through a graphical user interface (GUI) of computing system 802.

Figure 9:
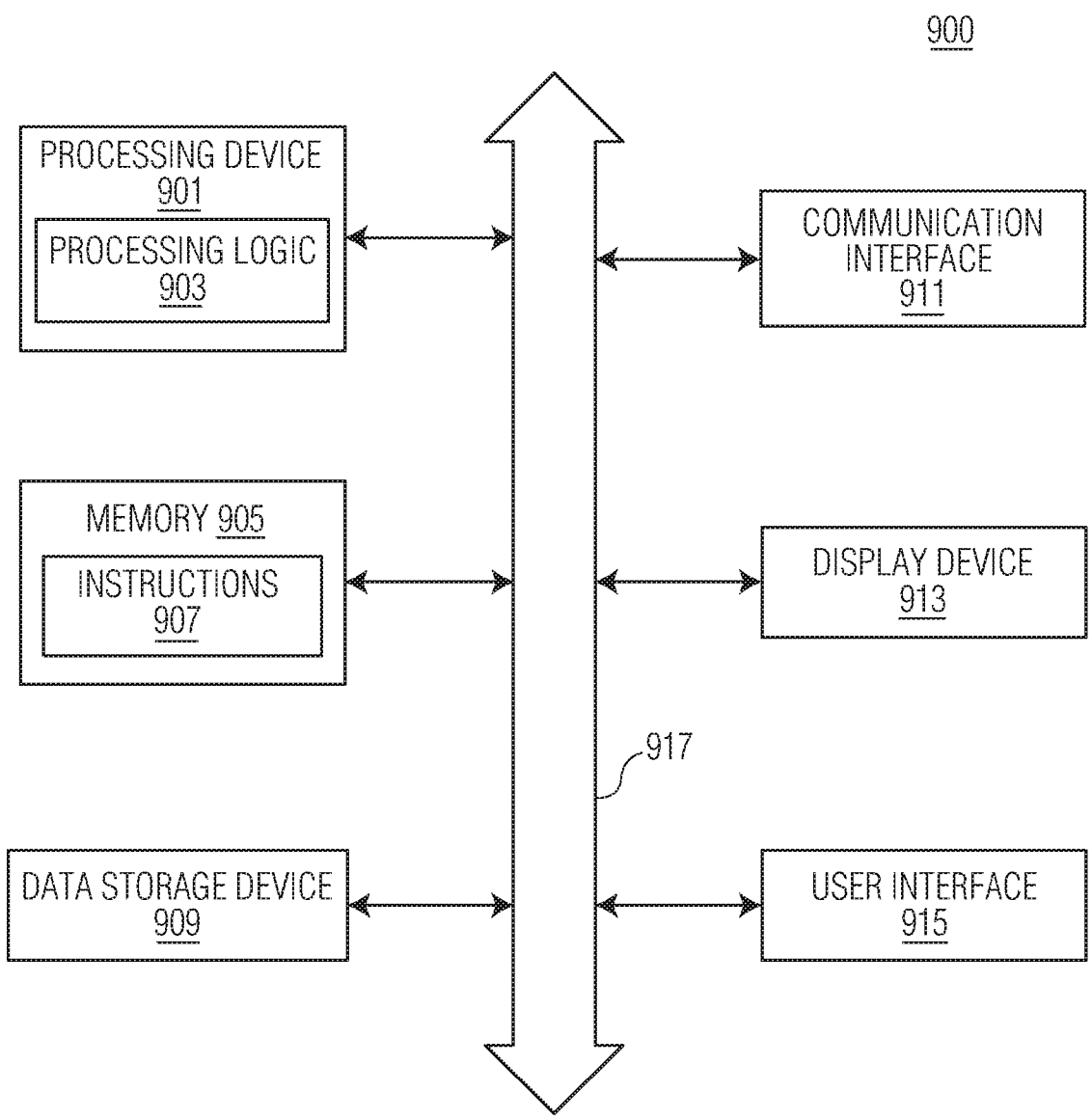
FIG. 9 is a functional block diagram illustrating an example computing system, according to example embodiments.

FIG. 9 illustrates a functional block diagram of a machine in the example form of computer system 900, within which a set of instructions for causing the machine to perform any one or more of the methodologies, processes, or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of servers 202-212 of interactive gaming platform 104, initiating player device 102, non-initiating player device(s) 106, controller 115, and display device 111 may be implemented by the example machine shown in FIG. 9 (or a combination of two or more of such machines).

Example computer system 900 may include processing device 901, memory 905, data storage device 909, and communication interface 911, which may communicate with each other via data and control bus 917. In some examples, computer system 900 may also include display device 913 and/or user interface 915.

Processing device 901 may include, without being limited to, a microprocessor, a central processing unit, an application specific integrated circuit (ASIC), a field programmable gate array (FPGA), a digital signal processor (DSP) and/or a network processor. Processing device 901 may be configured to execute processing logic 903 for performing the operations described herein. In general, processing device 901 may include any suitable special-purpose processing device specially programmed with processing logic 903 to perform the operations described herein.

Memory 905 may include, for example, without being limited to, at least one of a read-only memory (ROM), a random access memory (RAM), a flash memory, a dynamic RAM (DRAM) and a static RAM (SRAM), storing computer-readable instructions 907 executable by processing device 901. In general, memory 905 may include any suitable non-transitory computer readable storage medium storing computer-readable instructions 907 executable by processing device 901 for performing the operations described herein. Although one memory device 905 is illustrated in FIG. 9, in some examples, computer system 900 may include two or more memory devices (e.g., dynamic memory and static memory).

Computer system 900 may include communication interface device 911, for direct communication with other computers (including wired and/or wireless communication), and/or for communication with a network. In some examples, computer system 900 may include display device 913 (e.g., a liquid crystal display (LCD), a touch sensitive display, etc.). In some examples, computer system 900 may include user interface 915 (e.g., an alphanumeric input device, a cursor control device, etc.).

In some examples, computer system 900 may include data storage device 909 storing instructions (e.g., software) for performing any one or more of the functions described herein. Data storage device 909 may include any suitable non-transitory computer-readable storage medium, including, without being limited to, solid-state memories, optical media, and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system comprising:
    at least two player devices; and
    an interactive gaming platform comprising a processor and a memory, the interactive gaming platform communicatively coupled to the at least two player devices via at least one network, the interactive gaming platform configured to generate a virtual game space accessible by the at least two player devices, the virtual game space representing a multiplayer game comprising one or more phases, wherein each phase comprises one or more trigger events, the interactive gaming platform configured to:
        provide access of the virtual game space to the at least two player devices;
        receive one or more commands for controlling objects in the virtual game space from among the at least two player devices;
        aggregate actions taken by the objects in the virtual game space responsive to the received one or more commands;
        determine that the aggregate of the actions taken by the objects in the virtual game space corresponds to a trigger event;
        identify that the trigger event corresponds to progression to a next phase of the multiplayer game;
        update the virtual game space to include one or more sets of game attributes corresponding to the next phase of the multiplayer game;
        generating an updated game display depicting the next phase of the multiplayer game; and
        transmit the updated game display to the at least two player devices.

2. The system of claim 1, wherein the system further comprises a video server, the multiplayer server being configured to:
    identify one or more videos corresponding to a next phase of the multiplayer game when the aggregate of the actions corresponds to the trigger event; and
    instruct each of the at least two player devices to request the one or more videos from the video server.

3. The system of claim 1, wherein the interactive gaming platform is further configured to:
    register the at least two player devices prior to providing access to the virtual game space.

4. The system of claim 1, wherein the interactive gaming platform is further configured to:
    receive, from a first player device of the at least two player devices, a video recorded by the first player device for transmittal to a second player device of the at least two player device; and
    transmit the video to the second player device during gameplay.

5. The system of claim 1, wherein the system further comprises a video server, the interactive gaming platform is further configured to:
    receive a recorded video comprising one or more parameters defining a triggering condition associated with the video;
    receive one or more further commands for controlling objects in the virtual game space from among the at least two player devices;

aggregate further actions taken by the objects in the virtual game space responsive to the received one or more further commands;
identify that the further actions satisfy the triggering condition associated with the video; and
instruct at least one or more of a second player device and a first player device among the at least the two player devices to request the video from the video server.

6. The system of claim 1, wherein the multiplayer game comprises a node-based story map that represents the one or more phases of the multiplayer game.

7. The system of claim 1, wherein the at least two player devices comprise an initiating player device and one or more non-initiating player devices.

8. The system of claim 1, wherein the at least two player devices are not co-located.

9. The system of claim 1, wherein the interactive gaming platform comprises an advertisement server, the interactive gaming platform configured to:
instruct the advertisement server associated with the interactive gaming platform to provide an advertisement to the virtual game space.

10. The system of claim 1, wherein the interactive gaming platform is further configured to:
assign a role in the multiplayer game to each of the at least two player devices.

11. A method of managing a virtual game space, comprising:
providing, by an interactive game platform, access to a virtual game space to at least two player devices, the virtual game space represents a multiplayer game comprising one or more phases, wherein each phase comprises one or more trigger events;
receiving, by the interactive gaming platform, one or more commands for controlling objects in the virtual game space from among the at least two player devices;
aggregating, by the interactive gaming platform, actions taken by the objects in the virtual game space responsive to the received one or more commands;
determining, by the interactive gaming platform, that the aggregate of the actions taken by the objects in the virtual game space corresponds to a trigger event;
identifying, by the interactive gaming platform, that the trigger event corresponds to progression to a next phase of the multiplayer game;
updating, by the interactive gaming platform, the virtual game space to include one or more sets of game attributes corresponding to the next phase of the multiplayer game;
generating an updated game display depicting the next phase of the multiplayer game; and
transmitting, by the interactive gaming platform, the updated game display to the at least one player device.

12. The method of claim 11, further comprising:
identifying, by the interactive gaming platform, one or more videos corresponding to a next phase of the multiplayer game when the aggregate of the actions corresponds to the trigger event; and
instructing, by the interactive gaming platform, each of the at least two player devices to request the one or more videos from the video server.

13. The method of claim 11, further comprising:
registering, by the interactive gaming platform, the at least two player devices prior to providing access to the virtual game space.

14. The method of claim 11, further comprising:
receiving, by the interactive gaming platform from a first player device of the at least two player devices, a video recorded by the first player device for transmittal to a second player device of the at least two player device; and
transmitting, by the interactive gaming platform, the video to the second player device during gameplay.

15. The method of claim 11, further comprising:
receiving a recorded video comprising one or more parameters defining a triggering condition associated with the video;
receiving, by the interactive gaming platform, one or more further commands for controlling objects in the virtual game space from among the at least two player devices;
aggregating, by the interactive gaming platform, further actions taken by the objects in the virtual game space responsive to the received one or more further commands;
identifying, by the interactive gaming platform, that the further actions satisfy the triggering condition associated with the video; and
instructing, by the interactive gaming platform, at least one or more of a second player device and a first player device of the two or more player devices to request the video from the video server.

16. The method of claim 11, wherein the multiplayer game comprises a node-based story map that represents the one or more phases of the multiplayer game.

17. The method of claim 11, wherein the at least two player devices comprise an initiating player device and one or more non-initiating player devices.

18. The method of claim 11, wherein the at least two player devices are not co-located.

19. The method of claim 11, further comprising:
instructing, by the interactive gaming platform, an advertisement server associated with the interactive gaming platform to provide an advertisement to the virtual game space.

20. The method of claim 11, further comprising:
assigning, by the interactive gaming platform, a role in the multiplayer game to each of the at least two player devices.

21. A non-transitory computer readable medium including one or more sequences of instructions, which, when executed by one or more processors, cause the one or more processors to perform operations, comprising:
providing access to a virtual game space to at least two player devices, the virtual game space represents a multiplayer game comprising one or more phases, wherein each phase comprises one or more trigger events;
receiving one or more commands for controlling objects in the virtual game space from among the at least two player devices;
aggregating actions taken by the objects in the virtual game space responsive to the received one or more commands;
determining that the aggregate of the actions taken by the objects in the virtual game space corresponds to a trigger event;
identifying that the trigger event corresponds to progression to a next phase of the multiplayer game;
updating the virtual game space to include one or more sets of game attributes corresponding to the next phase of the multiplayer game;

generating an updated game display depicting the next phase of the multiplayer game; and transmitting the updated game display to the at least two player devices.

22. The non-transitory computer readable medium of claim 21, wherein the operations further comprise:

identifying one or more videos corresponding to a next phase of the multiplayer game when the aggregate of the actions corresponds to the trigger event; and instructing each of the at least two player devices to request the one or more videos from the video server.

23. The non-transitory computer readable medium of claim 21, wherein the operations further comprise:

registering the at least two player devices prior to providing access to the virtual game space.

24. The non-transitory computer readable medium of claim 21, wherein the operations further comprise:

receiving, from a first player device of the at least two player devices, a video recorded by the first player device for transmittal to a second player device of the at least two player device; and transmitting the video to the second player device during gameplay.

25. The non-transitory computer readable medium of claim 21, wherein the operations further comprise:

receiving a recorded video comprising one or more parameters defining a triggering condition associated with the recorded video;

receiving one or more further commands for controlling objects in the virtual game space from among the at least two player devices;

aggregating further actions taken by the objects in the virtual game space responsive to the received one or more further commands;

identifying that the further actions satisfy the triggering condition associated with the recorded video; and instructing at least one or more of a second player device and the first player device of the two or more player devices to request the recorded video from the video server.

26. The non-transitory computer readable medium of claim 21, wherein the multiplayer game comprises a node-based story map that represents the one or more phases of the multiplayer game.

27. The non-transitory computer readable medium of claim 21, wherein the at least two player devices comprise an initiating player device and one or more non-initiating player devices.

28. The non-transitory computer readable medium of claim 21, wherein the at least two player devices are not co-located.

29. The non-transitory computer readable medium of claim 21, wherein the operations further comprise:

instructing an advertisement server associated with the interactive gaming platform to provide an advertisement to the virtual game space.

30. The non-transitory computer readable medium of claim 21, wherein the operations further comprise:

assigning a role in the multiplayer game to each of the at least two player devices.

* * * * *